United States Patent
Khoshnevisan et al.

(10) Patent No.: US 12,035,247 B2
(45) Date of Patent: Jul. 9, 2024

(54) CONFIGURING SEPARATE POWER CONTROL ADJUSTMENT STATES FOR SOUNDING REFERENCE SIGNAL TRANSMISSIONS

(71) Applicant: QUALCOMM Incorporated, San Diego, CA (US)

(72) Inventors: Mostafa Khoshnevisan, San Diego, CA (US); Jing Sun, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 274 days.

(21) Appl. No.: 17/643,094

(22) Filed: Dec. 7, 2021

(65) Prior Publication Data

US 2022/0330165 A1    Oct. 13, 2022

Related U.S. Application Data

(60) Provisional application No. 63/168,824, filed on Mar. 31, 2021.

(51) Int. Cl.
*H04W 52/14* (2009.01)
*H04L 5/00* (2006.01)
(Continued)

(52) U.S. Cl.
CPC ......... *H04W 52/146* (2013.01); *H04L 5/0048* (2013.01); *H04W 8/24* (2013.01); *H04W 52/08* (2013.01)

(58) Field of Classification Search
CPC ..... H04W 52/08; H04W 52/146; H04W 8/24; H04L 5/0048
See application file for complete search history.

(56) References Cited

U.S. PATENT DOCUMENTS

2019/0082427 A1* 3/2019 Kim .................. H04W 72/0446
2019/0261281 A1* 8/2019 Jung ..................... H04W 52/50
(Continued)

OTHER PUBLICATIONS

CATT: "Correction on SRS Power Control", R1-2003599, 3GPP TSG RAN WG1 #101, 3rd Generation Partnership Project, Mobile Competence Centre, 650, Route Des Lucioles, F-06921, Sophia-Antipolis Cedex, France, RAN WG1, No. e-Meeting, May 25, 2020-Jun. 5, 2020, May 16, 2020, XP051885377, 6 Pages.
(Continued)

*Primary Examiner* — Raymond S Dean
(74) *Attorney, Agent, or Firm* — Guang Yu Zhang; Harrity & Harrity, LLP

(57) ABSTRACT

Various aspects of the present disclosure generally relate to wireless communication. In some aspects, a user equipment (UE) may receive, from a base station, an uplink power control configuration for a sounding reference signal (SRS) resource set associated with an uplink component carrier, wherein the uplink power control configuration configures separate power control adjustment states between SRS transmissions and physical uplink shared channel (PUSCH) transmissions, and wherein the uplink power control configuration indicates one of a first SRS power control adjustment state or a second SRS power control adjustment state. The UE may transmit, to the base station, an SRS based at least in part on the uplink power control configuration for the SRS resource set. Numerous other aspects are described.

30 Claims, 10 Drawing Sheets

(51) Int. Cl.
    *H04W 8/24*          (2009.01)
    *H04W 52/08*       (2009.01)

(56)                   References Cited

U.S. PATENT DOCUMENTS

| | | | | |
|---|---|---|---|---|
| 2020/0021941 | A1* | 1/2020 | Nguyen | H04W 4/027 |
| 2020/0351129 | A1* | 11/2020 | Kwak | H04W 72/53 |
| 2021/0051668 | A1* | 2/2021 | Yu | H04W 72/046 |
| 2022/0174609 | A1* | 6/2022 | Kang | H04W 52/42 |
| 2022/0248336 | A1* | 8/2022 | Matsumura | H04W 52/146 |

OTHER PUBLICATIONS

International Search Report and Written Opinion—PCT/US2022/070975—ISA/EPO—dated Jun. 15, 2022.

\* cited by examiner

CONFIGURING SEPARATE POWER CONTROL ADJUSTMENT STATES FOR SOUNDING REFERENCE SIGNAL TRANSMISSIONS

CROSS-REFERENCE TO RELATED APPLICATION

This patent application claims priority to U.S. Provisional Patent Application No. 63/168,824, filed on Mar. 31, 2021, entitled "CONFIGURING SEPARATE POWER CONTROL ADJUSTMENT STATES FOR SOUNDING REFERENCE SIGNAL TRANSMISSIONS," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for configuring separate power control adjustment states for sounding reference signal (SRS) transmissions.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes receiving, from a base station, an uplink power control configuration for a sounding reference signal (SRS) resource set associated with an uplink component carrier, wherein the uplink power control configuration configures separate power control adjustment states between SRS transmissions and physical uplink shared channel (PUSCH) transmissions, and wherein the uplink power control configuration indicates one of a first SRS power control adjustment state or a second SRS power control adjustment state; and transmitting, to the base station, an SRS based at least in part on the uplink power control configuration for the SRS resource set.

In some aspects, a method of wireless communication performed by a base station includes transmitting, to a UE, an uplink power control configuration for an SRS resource set associated with an uplink component carrier, wherein the uplink power control configuration configures separate power control adjustment states between SRS transmissions and PUSCH transmissions, and wherein the uplink power control configuration indicates one of a first SRS power control adjustment state or a second SRS power control adjustment state; and receiving, from the UE, an SRS based at least in part on the uplink power control configuration for the SRS resource set.

In some aspects, a UE for wireless communication includes a memory and one or more processors, coupled to the memory, configured to: receive, from a base station, an uplink power control configuration for an SRS resource set associated with an uplink component carrier, wherein the uplink power control configuration configures separate power control adjustment states between SRS transmissions and PUSCH transmissions, and wherein the uplink power control configuration indicates one of a first SRS power control adjustment state or a second SRS power control adjustment state; and transmit, to the base station, an SRS based at least in part on the uplink power control configuration for the SRS resource set.

In some aspects, a base station for wireless communication includes a memory and one or more processors, coupled to the memory, configured to: transmit, to a UE, an uplink power control configuration for an SRS resource set associated with an uplink component carrier, wherein the uplink power control configuration configures separate power control adjustment states between SRS transmissions and PUSCH transmissions, and wherein the uplink power control configuration indicates one of a first SRS power control adjustment state or a second SRS power control adjustment state; and receive, from the UE, an SRS based at least in part on the uplink power control configuration for the SRS resource set.

In some aspects, a non-transitory computer-readable medium storing a set of instructions for wireless communication includes one or more instructions that, when executed by one or more processors of a UE, cause the UE to: receive, from a base station, an uplink power control configuration for an SRS resource set associated with an uplink component carrier, wherein the uplink power control configuration configures separate power control adjustment states between SRS transmissions and PUSCH transmissions, and wherein the uplink power control configuration indicates one of a first SRS power control adjustment state or a second SRS power control adjustment state; and transmit, to the base station, an SRS based at least in part on the uplink power control configuration for the SRS resource set.

In some aspects, a non-transitory computer-readable medium storing a set of instructions for wireless communication includes one or more instructions that, when executed by one or more processors of a base station, cause the base station to: transmit, to a UE, an uplink power control configuration for an SRS resource set associated with an uplink component carrier, wherein the uplink power control configuration configures separate power control adjustment states between SRS transmissions and PUSCH transmissions, and wherein the uplink power control configuration indicates one of a first SRS power control adjustment state or a second SRS power control adjustment state; and receive, from the UE, an SRS based at least in part on the uplink power control configuration for the SRS resource set.

In some aspects, an apparatus for wireless communication includes means for receiving, from a base station, an uplink power control configuration for an SRS resource set associated with an uplink component carrier, wherein the uplink power control configuration configures separate power control adjustment states between SRS transmissions and PUSCH transmissions, and wherein the uplink power control configuration indicates one of a first SRS power control adjustment state or a second SRS power control adjustment state; and means for transmitting, to the base station, an SRS based at least in part on the uplink power control configuration for the SRS resource set.

In some aspects, an apparatus for wireless communication includes means for transmitting, to a UE, an uplink power control configuration for an SRS resource set associated with an uplink component carrier, wherein the uplink power control configuration configures separate power control adjustment states between SRS transmissions and PUSCH transmissions, and wherein the uplink power control configuration indicates one of a first SRS power control adjustment state or a second SRS power control adjustment state; and means for receiving, from the UE, an SRS based at least in part on the uplink power control configuration for the SRS resource set.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
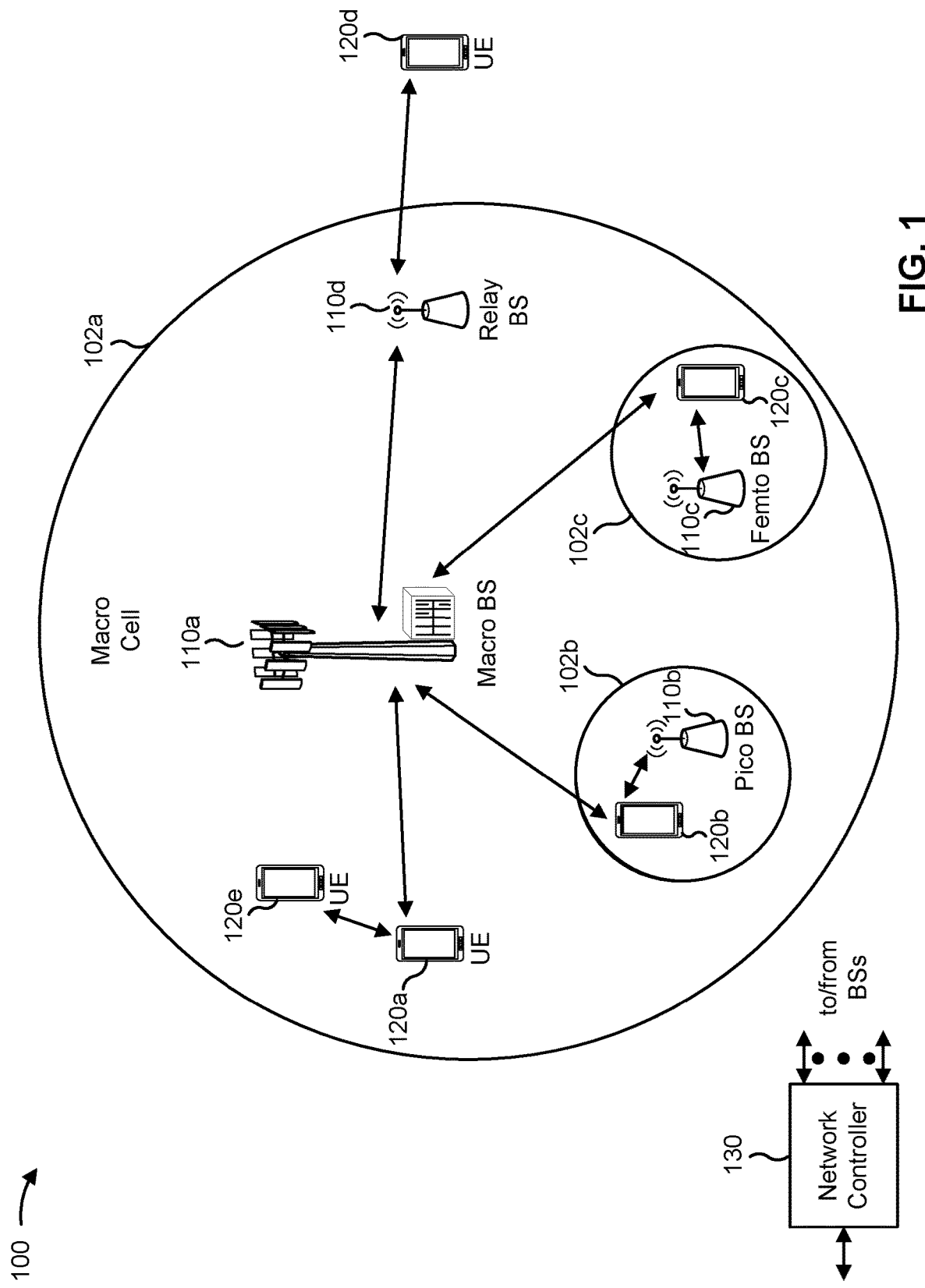
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

As indicated above, FIG. 1 is provided as an example. Other examples may differ from what is described with regard to FIG. 1.

Figure 2:
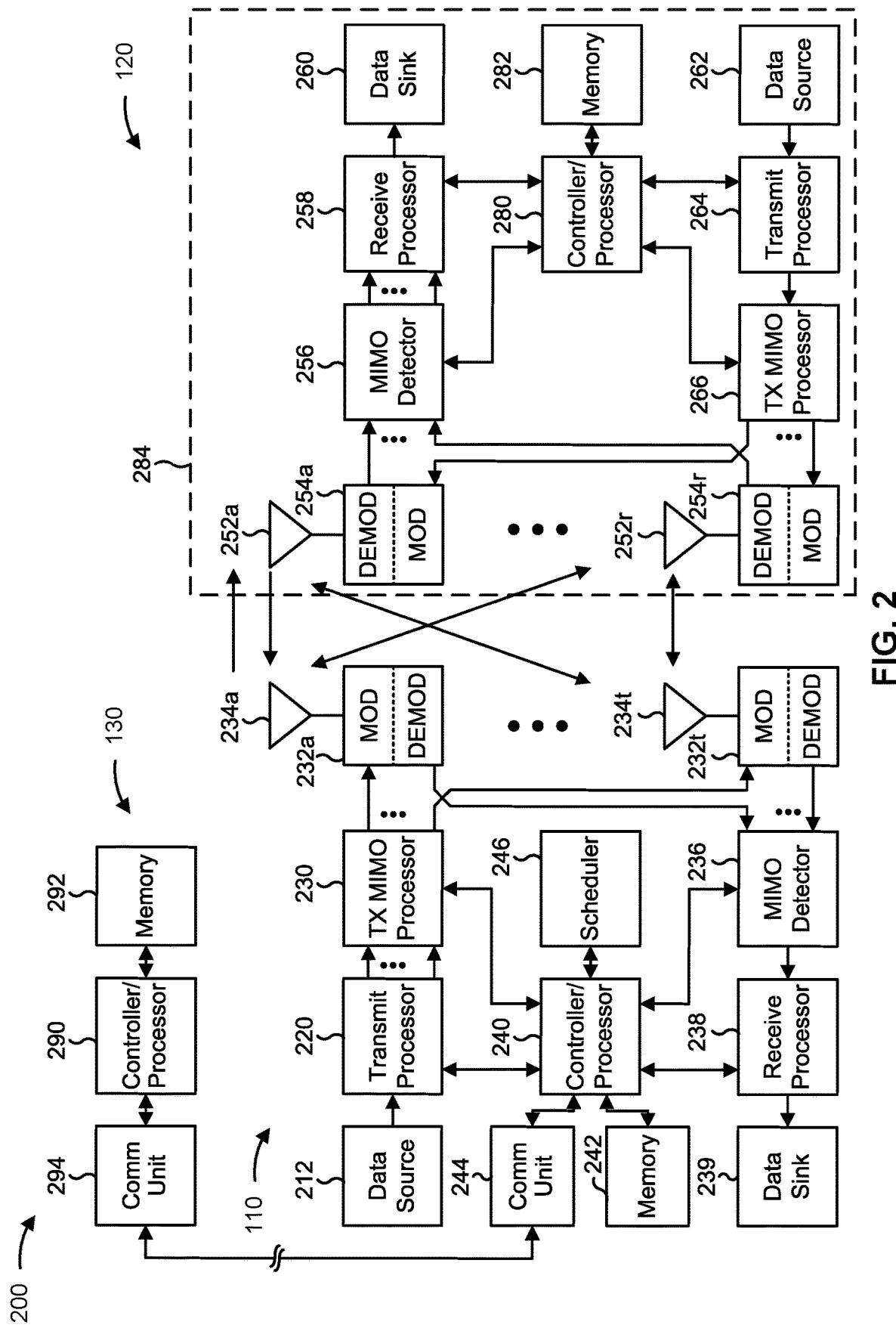
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-8).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the ULE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-8).

The controller/processor 240 of the base station 110, the controller/processor 280 of the UE 120, and/or any other component(s) of FIG. 2 may perform one or more techniques associated with configuring separate power control adjustment states for sounding reference signal (SRS) transmissions, as described in more detail elsewhere herein. For example, the controller/processor 240 of the base station 110, the controller/processor 280 of the UE 120, and/or any other component(s) of FIG. 2 may perform or direct operations of, for example, process 700 of FIG. 8, process 800 of FIG. 8, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 8, process 800 of FIG. 8, and/or other processes as described herein. In some examples, executing instructions may include running the instructions, converting the instructions, compiling the instructions, and/or interpreting the instructions, among other examples.

In some aspects, a UE (e.g., UE 120) includes means for receiving, from a base station, an uplink power control configuration for an SRS resource set associated with an uplink component carrier, wherein the uplink power control configuration configures separate power control adjustment states between SRS transmissions and physical uplink shared channel (PUSCH) transmissions, and wherein the uplink power control configuration indicates one of a first SRS power control adjustment state or a second SRS power control adjustment state; and/or means for transmitting, to the base station, an SRS based at least in part on the uplink power control configuration for the SRS resource set. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the base station includes means for transmitting, to a UE, an uplink power control configuration for an SRS resource set associated with an uplink component carrier, wherein the uplink power control configuration configures separate power control adjustment states between SRS transmissions and PUSCH transmissions, and wherein the uplink power control configuration indicates one of a first SRS power control adjustment state or a second SRS power control adjustment state; and/or means for receiving, from the UE, an SRS based at least in part on the uplink power control configuration for the SRS resource set. The means for the base station to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Uplink power control may determine a power for SRS transmissions. When a UE transmits an SRS based on a configuration by an SRS resource set (SRS-ResourceSet) on an active uplink (UL) bandwidth part (BWP) b of carrier f of serving cell c using an SRS power control adjustment state with index l, the UE may determine an SRS transmission power $P_{SRS,b,f,c}(i,q_s,l)$ (in dBm) in an SRS transmission occasion i as:

$$P_{SRS,b,f,c}(i, q_s, l) =$$

$$\min\begin{Bmatrix} P_{CMAX,f,c}(i), \\ P_{O\_SRS,b,f,c}(q_s) + 10\log_{10}(2^\mu \cdot M_{SRS,b,f,c}(i)) + \alpha_{SRS,b,f,c}(q_s) \cdot PL_{b,f,c}(q_d) + h_{b,f,c}(i, l) \end{Bmatrix},$$

where $P_{O\_SRS,b,f,c}(q_s)$ is provided by p0 (e.g., a value ranging from −202 to 24) for active UL BWP b of carrier f of serving cell c and SRS resource set $q_s$ provided by the SRS-ResourceSet and an SRS resource set identifier (SRS-ResourceSetId), and $\alpha_{SRS,b,f,c}(q_s)$ is provided by alpha for active UL BWP b of carrier f of serving cell c and SRS resource set $q_s$. Further, $PL_{b,f,c}(q_d)$ is a downlink pathloss estimate in dB calculated by the UE using a reference signal (RS) resource index $q_d$ for an active DL BWP of serving cell c and SRS resource set $q_s$. The RS resource index $q_d$ may be provided by a pathloss reference resource set (pathlossReferenceRS) associated with the SRS resource set $q_s$.

For the SRS power control adjustment state for active UL BWP b of carrier f of serving cell c and SRS transmission occasion i, $h_{b,f,c}(i,l)=f_{b,f,c}(i,l)$, where $f_{b,f,c}(i,l)$ is a current PUSCH power control adjustment state, if an SRS power control adjustment states parameter (srs-PowerControlAdjustmentStates) indicates a same power control adjustment state for SRS transmissions and PUSCH transmissions, or $$h_{b,f,c}(i) = h_{b,f,c}(i - i_0) + \sum_{m=0}^{C(S_i)-1} \delta_{SRS,b,f,c}(m)$$

if the UE is not configured for PUSCH transmissions on active UL BWP b of carrier f of serving cell c, or if the srs-PowerControlAdjustmentStates indicates separate power control adjustment states between SRS transmissions and PUSCH transmissions, and if tpc-Accumulation is not provided, where $\delta_{SRS,b,f,c}(m)$ is jointly coded with other transmit power control (TPC) commands in a physical downlink control channel (PDCCH) with DCI format 2_3.

Configurations per SRS resource set may include alpha, p0, a pathlossReferenceRS parameter, and an srs-PowerControlAdjustmentStates parameter, which may be associated with a separate closed loop (separateClosedLoop) parameter. Further, the srs-PowerControlAdjustmentStates parameter may indicate same adjustment states for SRS and PUSCH (and if same, first or second adjustment states, l=0,1) or a separate adjustment state for SRS. Further, $h_{b,c,f}(i,l)$ may indicate a closed loop power control adjustment state, where l=0 or 1. For $h_{b,f,c}(i)$, in the case of the separate adjustment state for SRS, only one closed loop index (one adjustment state) may be defined for SRS. In other words, no l in the function h(.). In the case of the separate adjustment state for SRS, TPC commands may be indicated in DCI format 2_3.

DCI format 2_3 may be applicable to UL component carriers (CCs) in which a PUSCH is not configured (e.g., for SRS carrier switching) or in the case of independent power control between the SRS and the PUSCH. DCI format 2_3 may be a group common DCI with a cyclic redundancy check (CRC) scrambled with a TPC SRS radio network temporary identifier (TPC-SRS-RNTI), where the DCI format 2_3 may contain multiple blocks, and a starting position of a block may be configured per UE. A payload/fields of the block may be based at least in part on whether an SRS request field is included or not included. The SRS request field may be configured optionally by a "fieldTypeFormat2-3" radio resource control (RRC) parameter, which may be two bits if configured. The payload/fields of the block may be based at least in part on whether the block is associated with a Type A or a Type B, which may be configured using an SRS TPC PDCCH group (srs-TPC-PDCCH-Group) parameter. For Type B, each block may include an SRS request field (0 or 2 bits) and a TPC command field (2 bits). The UE may be configured with multiple blocks for different uplink component carriers. For Type A, each block may include an SRS request field (0 or 2 bits) and N TPC command fields (2*Nbits) corresponding to different uplink component carriers, and only one block may be configured for the UE.

A TPC command field value of 0 may correspond to an accumulated $\delta_{SRS,b,f,c}$ value of −1 dB, a TPC command field value of 1 may correspond to an accumulated $\delta_{SRS,b,f,c}$ $\delta_{SRS,b,f,c}$ value of 0 dB, a TPC command field value of 2 may correspond to an accumulated $\delta_{SRS,b,f,c}\delta_{SRS,b,f,c}$ value of 1 dB, or a TPC command field value of 3 may correspond to an accumulated $\delta_{SRS,b,f,c}\delta_{SRS,b,f,c}$ value of 3 dB.

Figure 3:
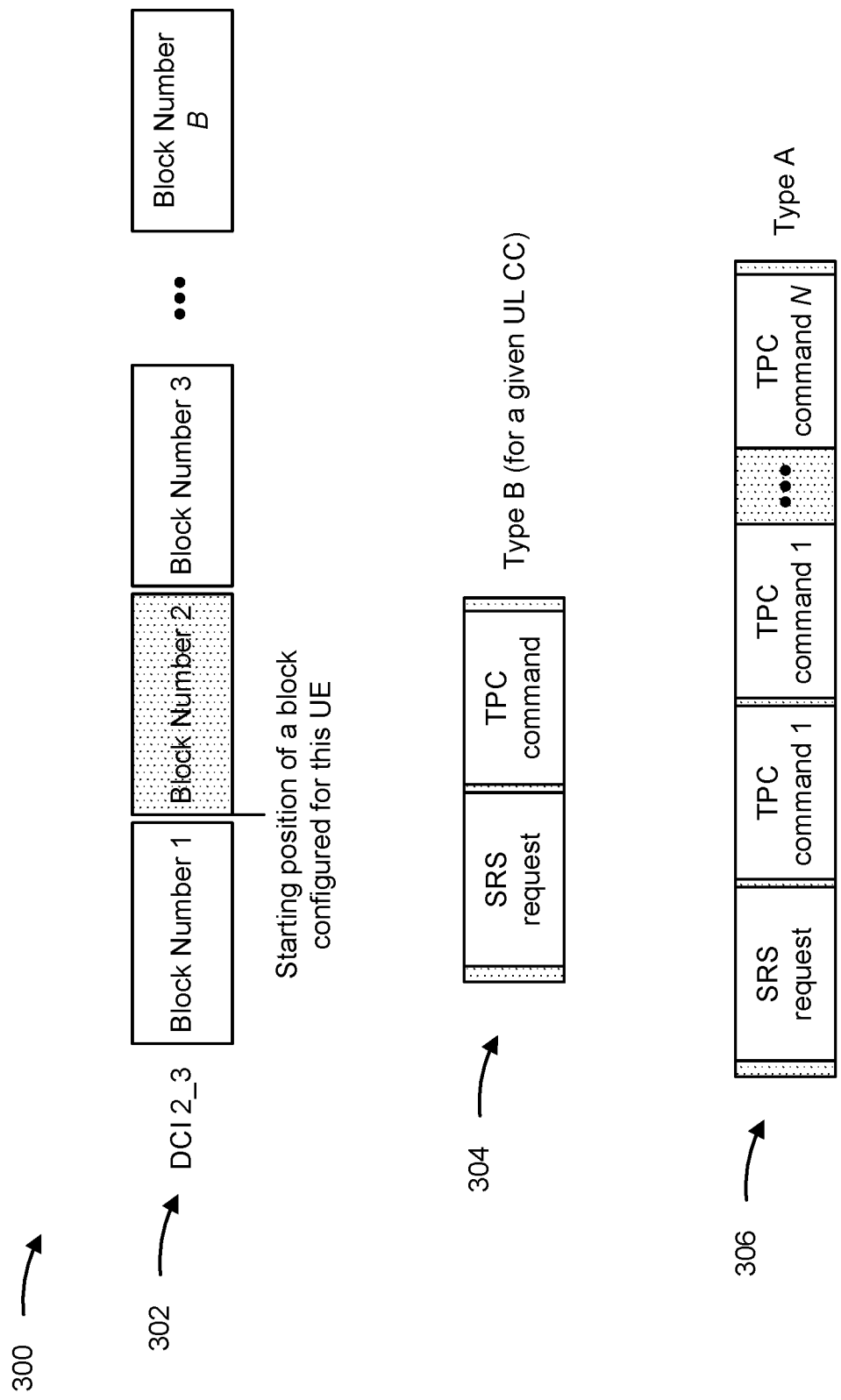
FIG. 3 is a diagram illustrating an example of a downlink control information (DCI) format, in accordance with the present disclosure.

FIG. 3 is a diagram illustrating an example 300 of a DCI format, in accordance with the present disclosure.

As shown by reference number 302, a DCI format 2_3 may include B blocks, and a starting position of a block (e.g., block number 2) may be configured for a certain UE. A block in the DCI format 2_3 may be a Type B block or a Type A block. As shown by reference number 304, a Type B block may include an SRS request field (0 or 2 bits) and a TPC command field (2 bits). The Type B block may be for a given uplink component carrier. As shown by reference number 306, a Type A block may include an SRS request field (0 or 2 bits) and N TPC command fields (2*N bits).

As indicated above, FIG. 3 is provided as an example. Other examples may differ from what is described with regard to FIG. 3.

An SRS request may differ between a Type A block and a Type B block. For a Type B block, a mapping between SRS resource sets and SRS request codepoints (e.g., 01, 10, or 11) may be given as part of an aperiodic SRS resource trigger (aperiodicSRS-Resource Trigger) parameter or an aperiodic SRS resource trigger list (aperiodicSRS-ResourceTriggerList) parameter as part of SRS resource set configurations. For a Type A block, an aperiodic SRS may be triggered for a set of CCs. Three sets of CCs may map to three codepoints (e.g., 01, 10, and 11), and a CC may belong to one or more sets of CCs. When an SRS is triggered for a set of CCs, aperiodic SRS resource sets configured with a usage of antenna switching (e.g., usage='antennaSwitching') in each CC from the set of CCs may be triggered.

When a value of an SRS request field is '01' and an srs-TPC-PDCCH-Group higher layer parameter is set to 'typeB', SRS resource set(s) may be configured by an SRS-ResourceSet with higher layer parameter aperiodicSRS-Resource Trigger set to 1 or an entry in aperiodicSRS-ResourceTriggerList set to 1. When a value of an SRS request field is '10' and an srs-TPC-PDCCH-Group higher layer parameter is set to 'typeB', SRS resource set(s) may be configured by an SRS-ResourceSet with higher layer parameter aperiodicSRS-ResourceTrigger set to 2 or an entry in aperiodicSRS-ResourceTriggerList set to 2. When a value of an SRS request field is '11' and an srs-TPC-PDCCH-Group higher layer parameter is set to 'typeB', SRS resource set(s) may be configured by an SRS-ResourceSet with higher layer parameter aperiodicSRS-ResourceTrigger set to 3 or an entry in aperiodicSRS-ResourceTriggerList set to 3.

When a value of an SRS request field is '01' and an srs-TPC-PDCCH-Group higher layer parameter is set to 'typeA', SRS resource set(s) may be configured with a higher layer parameter usage in an SRS-ResourceSet set to 'antennaSwitching' and a resourceType in an SRS-ResourceSet set to 'aperiodic' for a first set of serving cells configured by higher layers. When a value of an SRS request field is '10' and an srs-TPC-PDCCH-Group higher layer parameter is set to 'typeA', SRS resource set(s) may be configured with a higher layer parameter usage in an SRS-ResourceSet set to 'antennaSwitching', and a resourceType in an SRS-ResourceSet set to 'aperiodic' for a second set of serving cells configured by higher layers. When a value of an SRS request field is '11' and an srs-TPC-PDCCH-Group higher layer parameter is set to 'typeA', SRS resource set(s) may be configured with a higher layer parameter usage in an SRS-ResourceSet set to 'antennaSwitching' and a resourceType in an SRS-ResourceSet set to 'aperiodic' for a third set of serving cells configured by higher layers.

Different SRS resource sets may be transmitted with different UL beams (e.g., different spatial relations and/or UL transmission configuration indicator (TCI) states) or different UE panels, and different SRS resource sets may be received by different TRPs. Thus, having different power control adjustment states for SRSs may be useful. However, independent SRS power control from PUSCH power control with respect to a closed loop power control adjustment state, while allowing for two separate closed loop adjustment states only for SRS, is not currently supported.

In various aspects of techniques and apparatuses described herein, a UE may receive, from a base station, an uplink power control configuration for an SRS resource set associated with an uplink component carrier. The uplink power control configuration may configure separate power control adjustment states between SRS transmissions and PUSCH transmissions. The uplink power control configuration may indicate a first SRS power control adjustment state or a second SRS power control adjustment state. The first SRS power control adjustment state may be associated with a first closed loop index (e.g., l=0), and the second SRS power control adjustment state may be associated with a second closed loop index (e.g., l=1).

In past solutions, two closed loop adjustment states may be possible for SRS only when shared with PUSCH closed loop power control adjustment states and when the PUSCH is configured with two PUSCH power control adjustment states (twoPUSCH-PC-AdjustmentStates).

In some cases, using the same closed loop adjustment states as PUSCH may result in problems, so the SRS having separate power control than PUSCH may be advantageous. For example, when an uplink component carrier is configured with a PUSCH transmission, interference management and an interference profile may have different behaviors and properties for SRS resources versus PUSCH resources. Further, an SRS transmission may not be precoded (e.g., for the purpose of codebook-based PUSCH) while a PUSCH transmission is typically precoded and a target signal to interference and noise ratio (SINR) may be different between the PUSCH and the SRS. Further, receivers for SRS detection/estimation may have different properties (e.g., accuracy requirements) compared to receivers for PUSCH decoding. The different properties may relate to different UL target block error rate (BLER) requirements. Further, in some cases, an uplink component carrier may not be configured with a PUSCH transmission. For example, only an SRS may be transmitted in the uplink component carrier for the purpose of DL channel state information (CSI) acquisition, and a usage of an SRS resource set may be 'antennaSwitching'). Therefore, the SRS having two separate closed loop adjustment states, and being separate from power control of the PUSCH, may be advantageous for the SRS.

Figure 4:
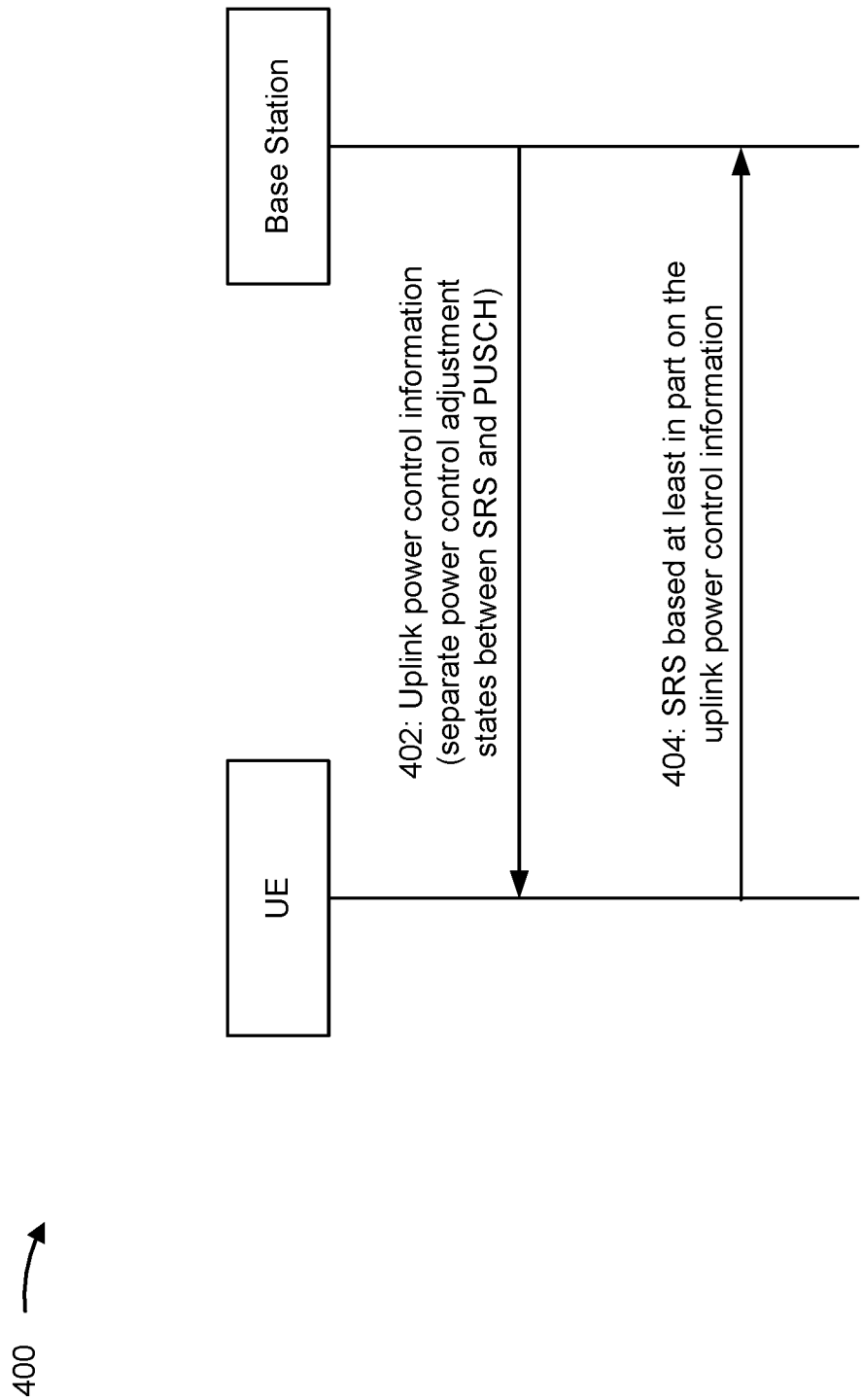
FIGS. 4-6 are diagrams illustrating examples associated with configuring separate power control adjustment states for sounding reference signal (SRS) transmissions, in accordance with the present disclosure.

FIG. 4 is a diagram illustrating an example 400 associated with configuring separate power control adjustment states for SRS transmissions, in accordance with the present disclosure. As shown in FIG. 4, example 400 includes communication between a UE (e.g., UE 120) and a base station (e.g., base station 110). In some aspects, the UE and the base station may be included in a wireless network such as wireless network 100.

As shown by reference number 402, the UE may receive, from the base station, an uplink power control configuration for an SRS resource set associated with an uplink component carrier. The uplink power control configuration may configure separate power control adjustment states between SRS transmissions and PUSCH transmissions. The uplink power control configuration may indicate a first SRS power control adjustment state or a second SRS power control adjustment state. In some aspects, the first SRS power control adjustment state may be associated with a first closed loop index (e.g., l=0), and the second SRS power control adjustment state may be associated with a second closed loop index (e.g., l=1). In some aspects, the first SRS power control adjustment state and the second SRS power control adjustment state may be configured for the uplink component carrier associated with the SRS resource set.

In some aspects, the SRS resource set may be associated with a first power control adjustment state that is shared between the SRS and the PUSCH, where the first power control adjustment state may be associated with the first closed loop index. Alternatively, the SRS resource set may be associated with a second power control adjustment state that is shared between the SRS and the PUSCH, where the second power control adjustment state may be associated with the second closed loop index. Alternatively, the SRS resource set may be associated with a third power control adjustment state, corresponding to the first SRS power control adjustment state, that may be separate for the SRS and the PUSCH, where the third power control adjustment state may be associated with the first closed loop index. Alternatively, the SRS resource set may be associated with a fourth power control adjustment state, corresponding to the second SRS power control adjustment state, that may be separate for the SRS and the PUSCH, where the fourth power control adjustment state is associated with the second closed loop index.

In some aspects, each SRS resource set may be configured with a separate power control adjustment state between SRS transmissions and PUSCH transmissions, and with one of two closed loop indices l=0 or l=1 corresponding to one of two separate power control adjustment states. A power control adjustment state configured for an SRS resource set may be one of four possibilities. For example, the power control adjustment state for the SRS resource set may be the same as a PUSCH with l=0, the power control adjustment state for the SRS resource set may be the same as a PUSCH with l=1, the power control adjustment state for the SRS resource set may be separate from a PUSCH with l=0, or the power control adjustment state for the SRS resource set may be separate from a PUSCH with l=1.

In some aspects, the UE may transmit, to the base station, UE capability signaling that indicates that the UE supports the separate power control adjustment states between SRS transmissions and PUSCH transmissions. The UE may support having the first SRS power control adjustment state and the second SRS power control adjustment state separate from PUSCH power control. The UE may receive, from the base station, the uplink power control configuration based at least in part on the UE capability signaling.

In some aspects, the power control adjustment state for the SRS resource set that is separate from the PUSCH with l=1 may be based at least in part on the UE indicating a support of two closed loops for SRS power control that is separate from PUSCH power control. The UE may indicate the support to the base station via UE capability signaling. The base station, based at least in part on the capability signaling, may configure a two SRS power control adjustment states (twoSRS-PC-AdjustmentStates) parameter for an uplink component carrier in which the SRS resource set is configured.

In some aspects, the UE may maintain two closed loop adjustment states for SRS transmissions in a given uplink component carrier when the UE is configured with a TPC accumulation (tpc-Accumulation) parameter for SRS, or when the UE is not configured with the tpc-Accumulation parameter since an absence of the tpc-Accumulation parameter results in TPC accumulation being enabled. Further, the UE may maintain the two closed loop adjustment states for the SRS transmissions in the given uplink component carrier when the UE is configured with the twoSRS-PC-AdjustmentStates parameter. In some aspects, the tpc-Accumulation parameter and the twoSRS-PC-AdjustmentStates parameter may be configured using an SRS configuration that is common to a plurality of SRS resource sets (e.g., all SRS resource sets) in the given uplink component carrier.

In some aspects, the UE may maintain the first SRS power control adjustment state and the second SRS power control adjustment state for SRS transmissions in the uplink component carrier based at least in part on the tpc-Accumulation parameter and the twoSRS-PC-AdjustmentStates parameter. The UE may receive, from the base station, the tpc-Accumulation parameter and the twoSRS-PC-AdjustmentStates parameter via an SRS configuration that is common to a plurality of SRS resource sets associated with the uplink component carrier.

In some aspects, $h_{b,c,f}(i,l)$, which may indicate the closed loop power control adjustment state, may be in accordance with $h_{b,c,f}(i,l)=h_{b,c,f}(i-i_0,l)+\Sigma_{m=0}^{e(S_l)-1}\delta_{SRS,b,f,c}(m,l)$, l=0,1, where $h_{b,c,f}(i-i_0,l)$ may be associated with accumulated TPC commands for an SRS transmission occasion $i-i_0$ with adjustment state l, and $\Sigma_{m=0}^{e(S_l)-1}\delta_{SRS,b,f,c}(m,l)$ may be associated with a sum of new TPC command values (in DCI formats 2_3) since a transmission occasion $i-i_0$ for an SRS power control adjustment state l.

In some aspects, the UE may receive, from the base station, DCI (e.g., DCI format 2_3) that indicates whether TPC commands for the uplink component carrier correspond to the first SRS power control adjustment state or the second SRS power control adjustment state when the uplink component carrier is configured with both the first SRS power control adjustment state and the second SRS power control adjustment state for SRS power control.

In some aspects, the DCI may include a block of a first type that is associated with the uplink component carrier. In some aspects, the block may include one bit appended to a TPC field to indicate whether a TPC command associated with the TPC field corresponds to the first SRS power control adjustment state or the second SRS power control adjustment state. In some aspects, the block may include a first TPC field corresponding to the first SRS power control adjustment state and a second TPC field corresponding to the second SRS power control adjustment state. In some aspects, the block may include a TPC field having a TPC command associated with the first SRS power control adjustment state or the second SRS power control adjustment state based at least in part on triggered SRS resource sets indicated by the DCI. In some aspects, the TPC command may be applied to the first SRS power control adjustment state when the triggered SRS resource sets in the uplink component carrier are configured with the first SRS power control adjustment state, or the TPC command may be applied to the second SRS power control adjustment state when the triggered SRS resource sets in the uplink component carrier are configured with the second SRS power control adjustment state.

In some aspects, the TPC command may be applied to the first SRS power control adjustment state and/or the second SRS power control adjustment state in accordance with a fixed rule when a first portion of the triggered SRS resource sets in the uplink component carrier are configured with the first SRS power control adjustment state, and a second portion of the triggered SRS resource sets in the uplink component carrier are configured with the second SRS power control adjustment state. In some aspects, the fixed rule may indicate that the TPC command is applied to the first SRS power control adjustment state. In some aspects, the fixed rule may indicate that the TPC command is applied to one of the first SRS power control adjustment state or the second SRS power control adjustment state that is configured for the SRS resource set with a lowest identifier or a highest identifier among triggered SRS resource sets. In some aspects, the fixed rule may indicate that the TPC command is applied to both the first SRS power control adjustment state and the second SRS power control adjustment state. In some aspects, the DCI may indicate the TPC command based at least in part on a radio resource control configuration or based at least in part on a function of an SRS resource set configuration or an SRS request field configuration.

In some aspects, the DCI may include a block of a second type that indicates TPC commands for a plurality of uplink component carriers. In some aspects, the block may include one common bit to indicate whether a plurality of TPC commands corresponding to the plurality of uplink component carriers are associated with the first SRS power control adjustment state or the second SRS power control adjustment state. In some aspects, the block may include one bit for each TPC field to indicate whether a TPC command associated with the TPC field corresponds to the first SRS power control adjustment state or the second SRS power control adjustment state.

In some aspects, the block may include one bit for a TPC command associated with an uplink component carrier in the plurality of uplink component carriers configured with both the first SRS power control adjustment state and the second SRS power control adjustment state for SRS power control, and the one bit may indicate whether the TPC command associated with the TPC field corresponds to the first SRS power control adjustment state or the second SRS power control adjustment state. In some aspects, the block may include a plurality of TPC fields corresponding to the plurality of uplink component carriers and corresponding to the first SRS power control adjustment state, and the block may include a plurality of additional TPC fields corresponding to the plurality of uplink component carriers and corresponding to the second SRS power control adjustment state.

In some aspects, the block may include a plurality of TPC fields corresponding to the plurality of uplink component carriers and corresponding to the first SRS power control adjustment state. The block may include an additional TPC field with an additional TPC command for an uplink component carrier in the plurality of uplink component carriers configured with both the first SRS power control adjustment state and the second SRS power control adjustment state for SRS power control. The additional TPC command may be associated with the second SRS power control adjustment state.

As shown by reference number 404, the UE may transmit, to the base station, an SRS based at least in part on the uplink power control configuration for the SRS resource set. The UE may transmit the SRS using an SRS resource associated with the SRS resource set. The UE may apply an uplink power control to an SRS transmission based at least in part on the uplink power control configuration for the SRS resource set.

As indicated above, FIG. 4 is provided as an example. Other examples may differ from what is described with regard to FIG. 4.

Figure 5:
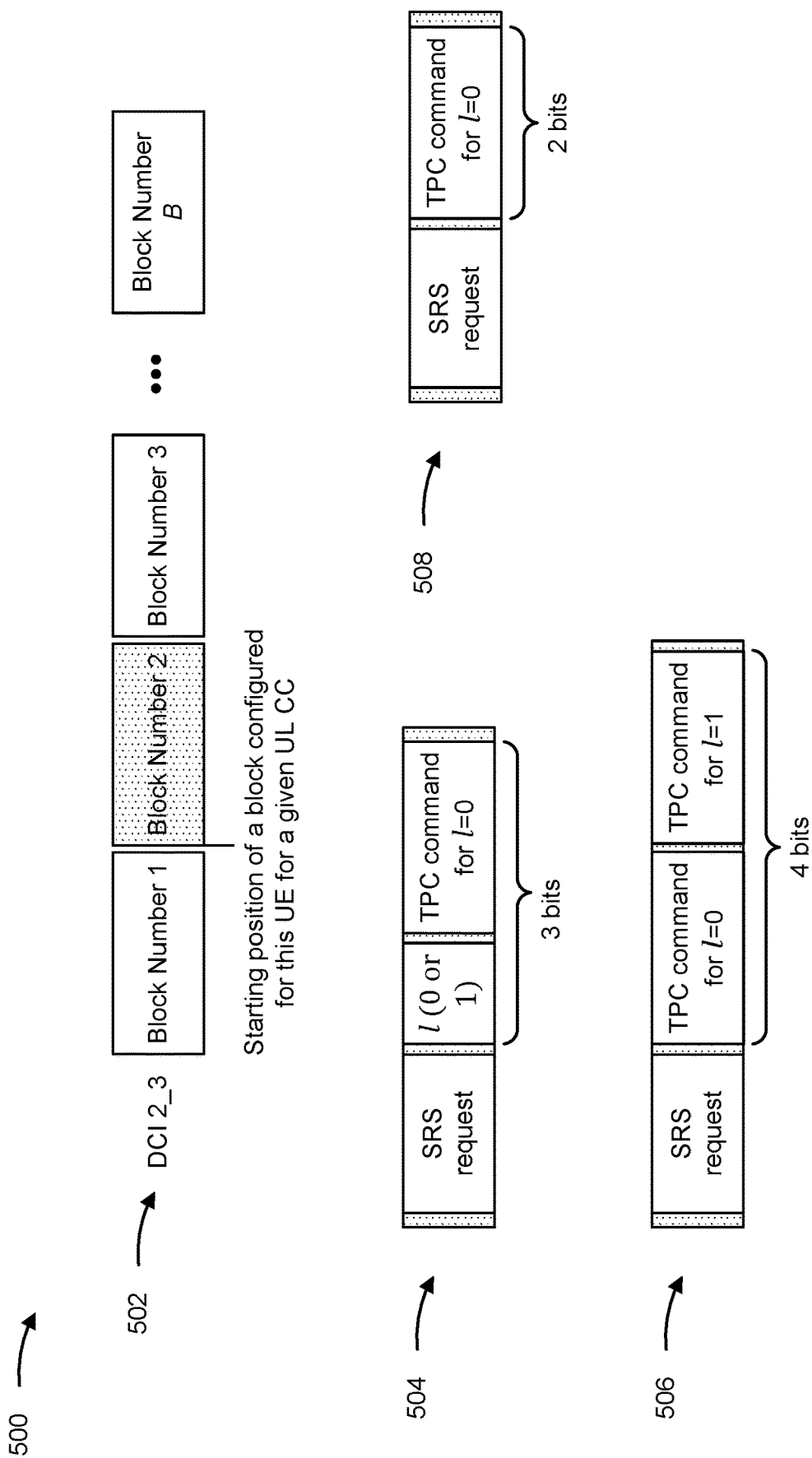

FIG. 5 is a diagram illustrating an example 500 associated with configuring separate power control adjustment states for SRS transmissions, in accordance with the present disclosure.

As shown by reference number 502, a DCI format 2_3 may include B blocks, and a starting position of a block (e.g., block number 2) may be configured for a certain UE for a given uplink component carrier. The DCI format 2_3 may include a Type B block. The Type B block may be based at least in part on an srs-TPC-PDCCH-Group parameter being set to TypeB, and the Type B block may be associated with the uplink component carrier.

The DCI format 2_3 may indicate whether a TPC command for the uplink component carrier corresponds to a first SRS power control adjustment state or a second SRS power control adjustment state (e.g., index l=0 or l=1) when the uplink component carrier is configured with two adjustment states for SRS power control (twoSRS-PC-Adjustment-States). In other words, l=0 may be associated with a first SRS power control adjustment state, and l=1 may be associated with a second SRS power control adjustment state.

As shown by reference number 504, in a first option, the Type B Block associated with the uplink component carrier may include one bit appended to a TPC field to indicate whether a TPC command corresponds to an SRS power control adjustment state with index l=0 or index l=1. The TPC field may become 3 bits.

As shown by reference number 506, in a second option, the Type B Block associated with the uplink component carrier may include two TPC fields (each 2 bits). The two TPC fields may correspond to a first SRS power control adjustment state with index l=0 and a second SRS power control adjustment state with l=1, respectively. In this case, a presence of an SRS request field may trigger multiple SRS resource sets, with some SRS resource sets being associated with the first SRS power control adjustment state with index l=0, and other SRS resource sets being associated with the second SRS power control adjustment state with index l=1.

As shown by reference number 508, in a third option, the Type B Block associated with the uplink component carrier may include one TPC field with 2 bits, and whether the TPC field is applied to the first SRS power control adjustment state with index l=0 or the second SRS power control adjustment state with index l=1 may depend on the triggered SRS resource sets. In other words, whether a TPC command in the TPC field is applied to l=0 or =1 may be based at least in part on an SRS request field, which may be present in the DCI format 2_3.

In some aspects, when a plurality of triggered SRS resource sets in the uplink component carrier (e.g., all triggered SRS resource sets that map to an indicated codepoint of the SRS request field) are configured with l=0, the TPC command may be applied to a first SRS power control adjustment state with index l=0. In some aspects, when a plurality of triggered SRS resource sets in the uplink component carrier (e.g., all triggered SRS resource sets that map to an indicated codepoint of the SRS request field) are configured with l=1, the TPC command may be applied to a first SRS power control adjustment state with index l=1.

In some aspects, when some triggered SRS resource sets in the uplink component carrier are configured with l=0 and other triggered SRS resource sets in the uplink component carrier are configured with l=1, a fixed rule may be applied. For example, the TPC command may be applied to l=0 (e.g., the first SRS power control adjustment state), or the TPC command may be applied to an adjustment state 1 that is configured for an SRS resource set with a lowest/highest ID among the triggered SRS resource sets, or the TPC command may be applied to both l=0 and l=1 (e.g., both the first and the second SRS power control adjustment state).

In some aspects, the first option, the second option or the third option may be RRC configured for DCI format 2_3 or may be a function of an SRS resource set configuration or an SRS request field configurations. For example, when an SRS request field is not configured (or not present) for DCI format 2_3, the first option or the second option may be employed. When an SRS request field is configured (or present) for DCI format 2_3, and at least one SRS request codepoint (e.g., 01, 10, or 11) is mapped to two SRS resource sets that are configured with the different power control adjustment states, the first option or the second option may be employed. When an SRS request field is configured (or present) for DCI format 2_3, and all SRS resource sets that are mapped to the same SRS request codepoint (e.g., 01, 10, or 11) are configured with the same power control adjustment state, the third option may be employed.

As indicated above, FIG. 5 is provided as an example. Other examples may differ from what is described with regard to FIG. 5.

Figure 6:
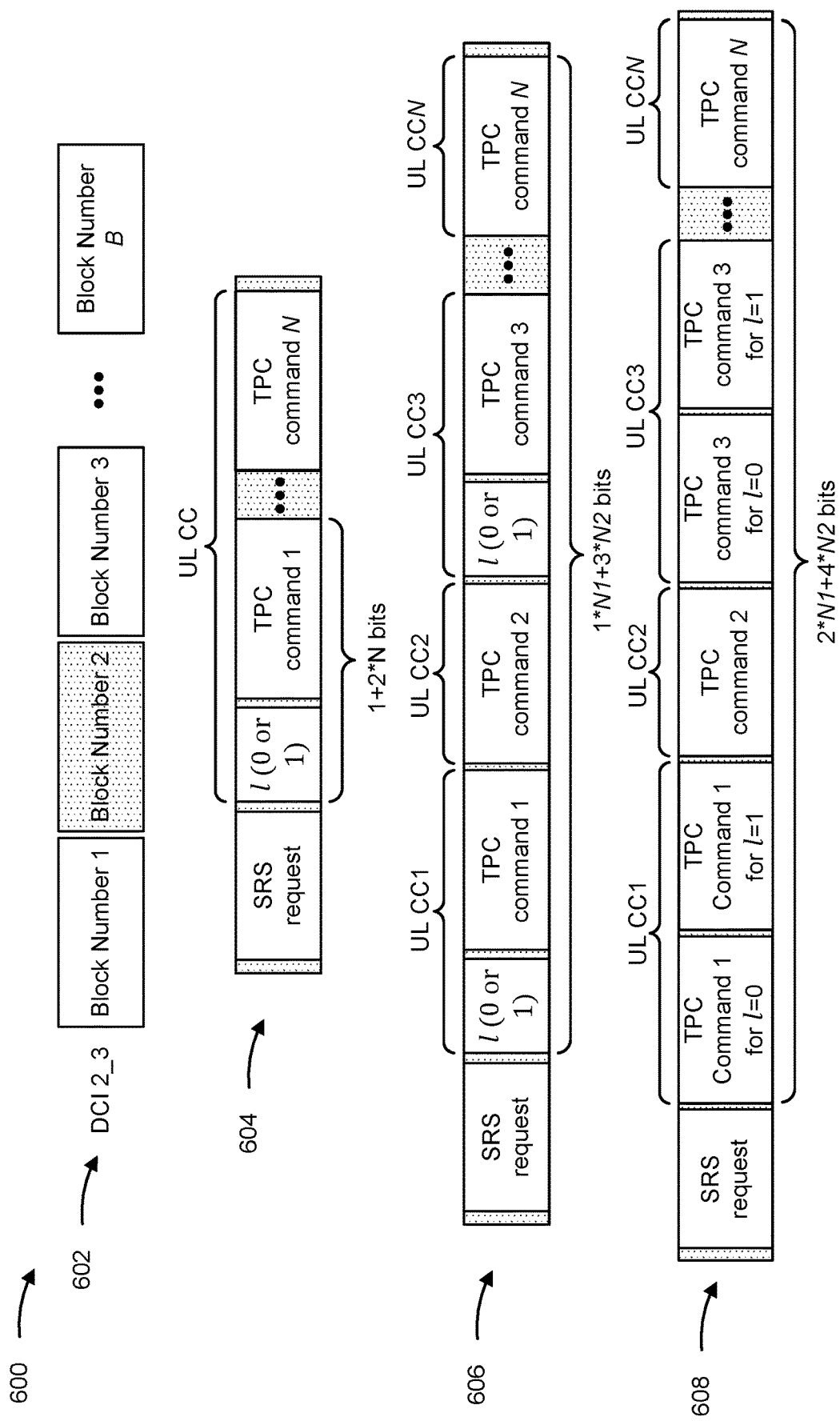

FIG. 6 is a diagram illustrating an example 600 associated with configuring separate power control adjustment states for SRS transmissions, in accordance with the present disclosure.

As shown by reference number 602, a DCI format 2_3 may include B blocks, and a starting position of a block (e.g., block number 2) may be configured for a certain UE. The DCI format 2_3 may include a Type A block. The Type A block may be based at least in part on an srs-TPC-PDCCH-Group parameter being set to TypeA, and the Type A block may indicate TPC commands for N uplink component carriers.

As shown by reference number 604, in a first option, the Type A block may include one common bit to indicate whether a TPC command 1, 2, . . . , N corresponds to l=0 or l=1. In other words, depending on a value of the one common bit, all of the TPC commands in the Type A block may correspond to a first SRS power control adjustment state with index l=0, or all of the TPC commands in the Type A block may correspond to a second SRS power control adjustment state with index l=1. Further, 1+2*Nbits may correspond to TPC-related information in the Type A block. The one bit may only be applicable to uplink component carriers configured with two adjustment states for SRS power control (twoSRS-PC-AdjustmentStates).

In some aspects, the Type A block may include one bit specific to each TPC field 1, 2, . . . , N to indicate whether each TPC command corresponds to l=0 or l=1. In this case, 3*N bits may correspond to TPC-related information in the Type A block.

As shown by reference number 606, in a second option, an additional bit to indicate whether a TPC command 1, 2, . . . , N corresponds to l=0 or l=1 may only be added for TPC commands associated with uplink component carriers configured with two adjustment states for SRS power control. In other words, some TPC commands may have an associated bit to indicate whether the TPC commands correspond to l=0 or l=1, while other TPC commands may not have an associated bit. In this case, 2*N1+3*N2 bits may correspond to TPC-related information in the Type A block, where N1+N2=N, and where N1 is a quantity of TPC commands associated with uplink component carriers configured with one adjustment state for SRS power control, and N2 is a quantity of TPC commands associated with uplink component carriers configured with two adjustment states for SRS power control.

In some aspects, existing N TPC fields may indicate TPC commands for l=0 and N additional TPC fields may be added to indicate TPC commands for l=1. In this case, 4*Nbits may correspond to TPC-related information in the Type A block.

As shown by reference number 608, in a third option, an additional TPC field may only be added for uplink component carriers configured with two adjustment states for SRS power control. In other words, a single TPC field may be associated with uplink component carriers configured with one adjustment state for SRS power control, and two TPC fields may be associated with uplink component carriers configured with two adjustment states for SRS power control. In this case, 2*N1+4*N2 bits may correspond to TPC-related information in the Type A block, where N1+N2=N, and where N1 is a quantity of uplink component carriers configured with one adjustment state for SRS power control, and N2 is a quantity of uplink component carriers configured with two adjustment states for SRS power control.

As indicated above, FIG. 6 is provided as an example. Other examples may differ from what is described with regard to FIG. 6.

Figure 7:
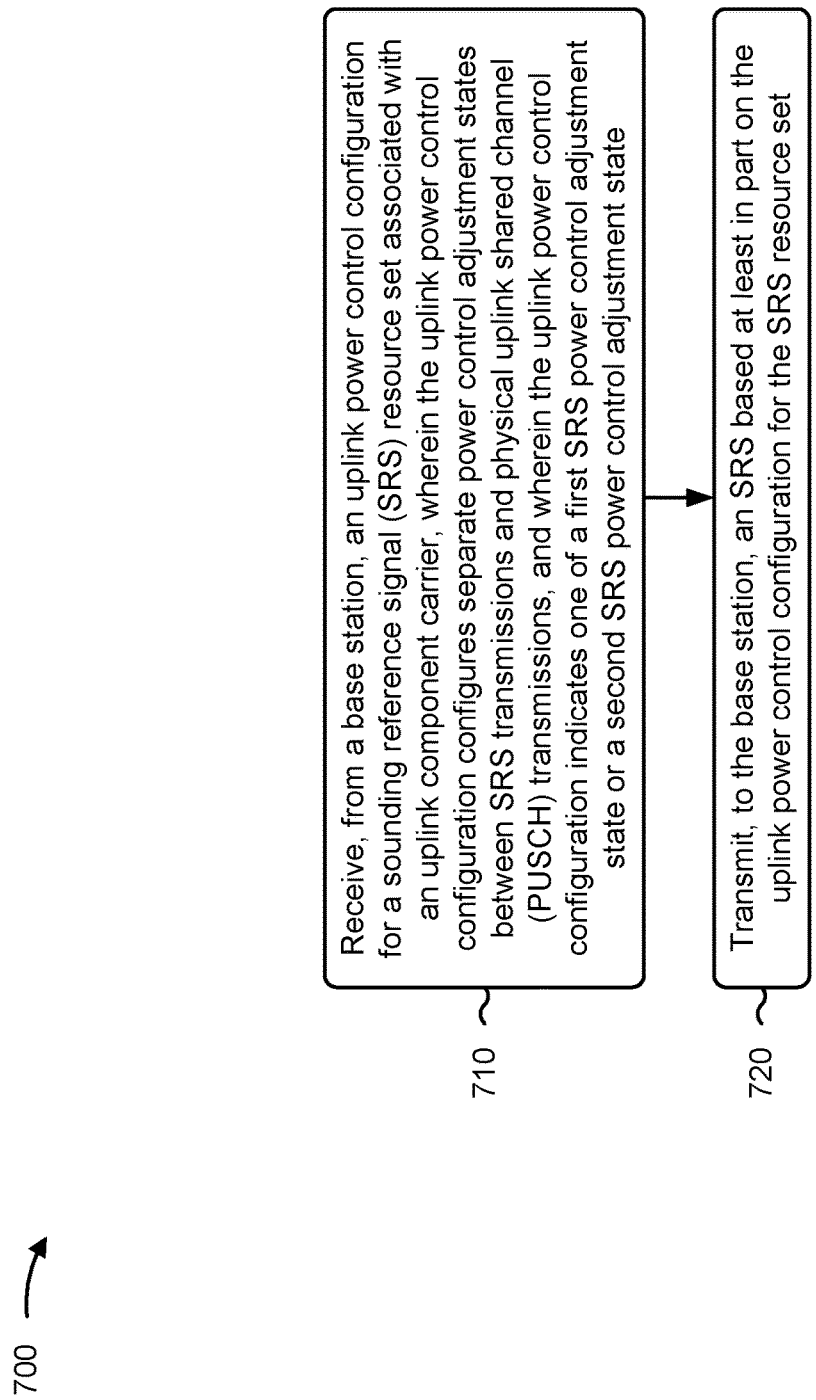
FIGS. 7-8 are diagrams illustrating example processes associated with configuring separate power control adjustment states for SRS transmissions, in accordance with the present disclosure.

FIG. 7 is a diagram illustrating an example process 700 performed, for example, by a UE, in accordance with the present disclosure. Example process 700 is an example where the UE (e.g., UE 120) performs operations associated with configuring separate power control adjustment states for SRS transmissions.

As shown in FIG. 7, in some aspects, process 700 may include receiving, from a base station, an uplink power control configuration for an SRS resource set associated with an uplink component carrier, wherein the uplink power control configuration configures separate power control adjustment states between SRS transmissions and PUSCH transmissions, and wherein the uplink power control configuration indicates one of a first SRS power control adjustment state or a second SRS power control adjustment state (block 710). For example, the UE (e.g., using reception component 902, depicted in FIG. 9) may receive, from a base station, an uplink power control configuration for an SRS resource set associated with an uplink component carrier, wherein the uplink power control configuration configures separate power control adjustment states between SRS transmissions and PUSCH transmissions, and wherein the uplink power control configuration indicates one of a first SRS power control adjustment state or a second SRS power control adjustment state, as described above.

As further shown in FIG. 7, in some aspects, process 700 may include transmitting, to the base station, an SRS based at least in part on the uplink power control configuration for the SRS resource set (block 720). For example, the UE (e.g., using transmission component 904, depicted in FIG. 9) may transmit, to the base station, an SRS based at least in part on the uplink power control configuration for the SRS resource set, as described above.

Process 700 may include additional aspects, such as any single aspect or any combination of aspects described below and/or in connection with one or more other processes described elsewhere herein.

In a first aspect, process 700 includes transmitting, to the base station, UE capability signaling that indicates that the UE supports the separate power control adjustment states between SRS transmissions and PUSCH transmissions, and wherein the UE supports having the first SRS power control adjustment state and the second SRS power control adjustment state separate from PUSCH power control, and wherein receiving the uplink power control configuration for the SRS resource set comprises receiving the uplink power control configuration based at least in part on the UE capability signaling.

In a second aspect, alone or in combination with the first aspect, the first SRS power control adjustment state is associated with a first closed loop index and the second SRS power control adjustment state is associated with a second closed loop index.

In a third aspect, alone or in combination with one or more of the first and second aspects, the SRS resource set is associated with one or more of a first power control adjustment state that is shared between the SRS and the PUSCH, wherein the first power control adjustment state is associated with a first closed loop index, a second power control adjustment state that is shared between the SRS and the PUSCH, wherein the second power control adjustment state is associated with a second closed loop index, a third power control adjustment state, corresponding to the first SRS power control adjustment state, that is separate for the SRS and the PUSCH, wherein the third power control adjustment state is associated with the first closed loop index, or a fourth power control adjustment state, corresponding to the second SRS power control adjustment state, that is separate for the SRS and the PUSCH, wherein the fourth power control adjustment state is associated with the second closed loop index.

In a fourth aspect, alone or in combination with one or more of the first through third aspects, the first SRS power control adjustment state and the second SRS power control adjustment state are configured for the uplink component carrier associated with the SRS resource set.

In a fifth aspect, alone or in combination with one or more of the first through fourth aspects, process 700 includes maintaining the first SRS power control adjustment state and the second SRS power control adjustment state for SRS transmissions in the uplink component carrier based at least in part on a TPC-accumulation parameter and a two-SRS-power-control-adjustment-states parameter.

In a sixth aspect, alone or in combination with one or more of the first through fifth aspects, process 700 includes receiving, from the base station, the TPC-accumulation parameter and the two-SRS-power-control-adjustment-states parameter via an SRS configuration that is common to a plurality of SRS resource sets associated with the uplink component carrier.

In a seventh aspect, alone or in combination with one or more of the first through sixth aspects, process 700 includes receiving, from the base station, DCI that indicates whether TPC commands for the uplink component carrier correspond to the first SRS power control adjustment state or the second SRS power control adjustment state when the uplink component carrier is configured with both the first SRS power control adjustment state and the second SRS power control adjustment state for SRS power control.

In an eighth aspect, alone or in combination with one or more of the first through seventh aspects, the DCI is a DCI format 2_3.

In a ninth aspect, alone or in combination with one or more of the first through eighth aspects, the DCI includes a block of a first type that is associated with the uplink component carrier.

In a tenth aspect, alone or in combination with one or more of the first through ninth aspects, the block includes one bit appended to a TPC field to indicate whether a TPC command associated with the TPC field corresponds to the first SRS power control adjustment state or the second SRS power control adjustment state.

In an eleventh aspect, alone or in combination with one or more of the first through tenth aspects, the block includes a first TPC field corresponding to the first SRS power control adjustment state and a second TPC field corresponding to the second SRS power control adjustment state.

In a twelfth aspect, alone or in combination with one or more of the first through eleventh aspects, the block includes a TPC field having a TPC command associated with the first SRS power control adjustment state or the second SRS power control adjustment state based at least in part on triggered SRS resource sets indicated by the DCI.

In a thirteenth aspect, alone or in combination with one or more of the first through twelfth aspects, the TPC command is applied to the first SRS power control adjustment state when the triggered SRS resource sets in the uplink component carrier are configured with the first SRS power control adjustment state, or the TPC command is applied to the second SRS power control adjustment state when the triggered SRS resource sets in the uplink component carrier are configured with the second SRS power control adjustment state.

In a fourteenth aspect, alone or in combination with one or more of the first through thirteenth aspects, the TPC command is applied to one or more of the first SRS power control adjustment state or the second SRS power control adjustment state in accordance with a fixed rule when a first portion of the triggered SRS resource sets in the uplink component carrier are configured with the first SRS power control adjustment state and a second portion of the triggered SRS resource sets in the uplink component carrier are configured with the second SRS power control adjustment state.

In a fifteenth aspect, alone or in combination with one or more of the first through fourteenth aspects, the fixed rule indicates that the TPC command is applied to the first SRS power control adjustment state, the fixed rule indicates that the TPC command is applied to one of the first SRS power control adjustment state or the second SRS power control adjustment state that is configured for the SRS resource set with a lowest identifier or a highest identifier among triggered SRS resource sets, or the fixed rule indicates that the TPC command is applied to both the first SRS power control adjustment state and the second SRS power control adjustment state.

In a sixteenth aspect, alone or in combination with one or more of the first through fifteenth aspects, the DCI indicates the TPC command based at least in part on a radio resource control configuration or based at least in part on a function of an SRS resource set configuration or an SRS request field configuration.

In a seventeenth aspect, alone or in combination with one or more of the first through sixteenth aspects, the DCI includes a block of a second type that indicates TPC commands for a plurality of uplink component carriers.

In an eighteenth aspect, alone or in combination with one or more of the first through seventeenth aspects, the block includes one common bit to indicate whether a plurality of TPC commands corresponding to the plurality of uplink component carriers are associated with the first SRS power control adjustment state or the second SRS power control adjustment state.

In a nineteenth aspect, alone or in combination with one or more of the first through eighteenth aspects, the block includes one bit for each TPC field to indicate whether a TPC command associated with the TPC field corresponds to the first SRS power control adjustment state or the second SRS power control adjustment state.

In a twentieth aspect, alone or in combination with one or more of the first through nineteenth aspects, the block includes one bit for a TPC command associated with an uplink component carrier in the plurality of uplink component carriers configured with both the first SRS power control adjustment state and the second SRS power control adjustment state for SRS power control, and wherein the one bit indicates whether the TPC command associated with the TPC field corresponds to the first SRS power control adjustment state or the second SRS power control adjustment state.

In a twenty-first aspect, alone or in combination with one or more of the first through twentieth aspects, the block includes a plurality of TPC fields corresponding to the plurality of uplink component carriers and corresponding to the first SRS power control adjustment state, and wherein the block includes a plurality of additional TPC fields corresponding to the plurality of uplink component carriers and corresponding to the second SRS power control adjustment state.

In a twenty-second aspect, alone or in combination with one or more of the first through twenty-first aspects, the block includes a plurality of TPC fields corresponding to the plurality of uplink component carriers and corresponding to the first SRS power control adjustment state, wherein the block includes an additional TPC field with an additional TPC command for an uplink component carrier in the plurality of uplink component carriers configured with both the first SRS power control adjustment state and the second SRS power control adjustment state for SRS power control, and wherein the additional TPC command is associated with the second SRS power control adjustment state.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
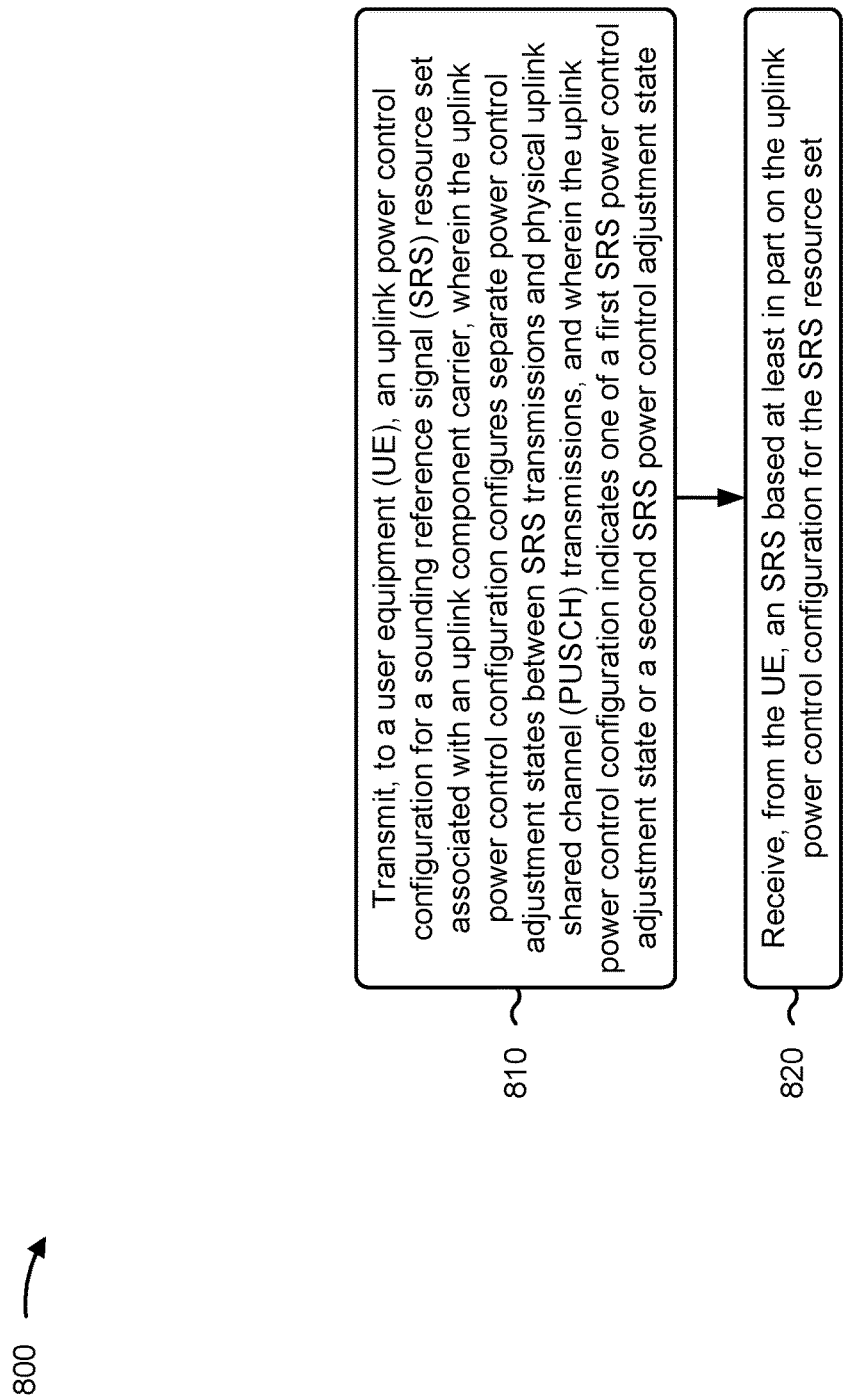

FIG. 8 is a diagram illustrating an example process 800 performed, for example, by a base station, in accordance with the present disclosure. Example process 800 is an example where the base station (e.g., base station 110) performs operations associated with configuring separate power control adjustment states for SRS transmissions.

As shown in FIG. 8, in some aspects, process 800 may include transmitting, to a UE, an uplink power control configuration for an SRS resource set associated with an uplink component carrier, wherein the uplink power control configuration configures separate power control adjustment states between SRS transmissions and PUSCH transmissions, and wherein the uplink power control configuration indicates one of a first SRS power control adjustment state or a second SRS power control adjustment state (block 810). For example, the base station (e.g., using transmission component 1004, depicted in FIG. 10) may transmit, to a UE, an uplink power control configuration for an SRS resource set associated with an uplink component carrier, wherein the uplink power control configuration configures separate power control adjustment states between SRS transmissions and PUSCH transmissions, and wherein the uplink power control configuration indicates one of a first SRS power control adjustment state or a second SRS power control adjustment state, as described above.

As further shown in FIG. 8, in some aspects, process 800 may include receiving, from the UE, an SRS based at least in part on the uplink power control configuration for the SRS resource set (block 820). For example, the base station (e.g., using reception component 1002, depicted in FIG. 10) may receive, from the UE, an SRS based at least in part on the uplink power control configuration for the SRS resource set, as described above.

Process 800 may include additional aspects, such as any single aspect or any combination of aspects described below and/or in connection with one or more other processes described elsewhere herein.

In a first aspect, process 800 includes receiving, from the UE, UE capability signaling that indicates that the UE supports the separate power control adjustment states between SRS transmissions and PUSCH transmissions, and wherein the UE supports having the first SRS power control adjustment state and the second SRS power control adjustment state separate from PUSCH power control, and wherein transmitting the uplink power control configuration for the SRS resource set comprises transmitting the uplink power control configuration based at least in part on the UE capability signaling.

In a second aspect, alone or in combination with the first aspect, the first SRS power control adjustment state and the second SRS power control adjustment state for SRS transmissions in the uplink component carrier are based at least in part on a TPC-accumulation parameter and a two-SRS-power-control-adjustment-states parameter.

In a third aspect, alone or in combination with one or more of the first and second aspects, process 800 includes transmitting, to the UE, the TPC-accumulation parameter and the two-SRS-power-control-adjustment-states parameter via an SRS configuration that is common to a plurality of SRS resource sets associated with the uplink component carrier.

In a fourth aspect, alone or in combination with one or more of the first through third aspects, process 800 includes transmitting, to the UE, DCI that indicates whether TPC commands for the uplink component carrier correspond to the first SRS power control adjustment state or the second SRS power control adjustment state when the uplink component carrier is configured with both the first SRS power control adjustment state and the second SRS power control adjustment state for SRS power control.

In a fifth aspect, alone or in combination with one or more of the first through fourth aspects, the DCI is a DCI format 2_3.

In a sixth aspect, alone or in combination with one or more of the first through fifth aspects, the DCI includes a block of a first type that is associated with the uplink component carrier.

In a seventh aspect, alone or in combination with one or more of the first through sixth aspects, the DCI includes a block of a second type that indicates TPC commands for a plurality of uplink component carriers.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
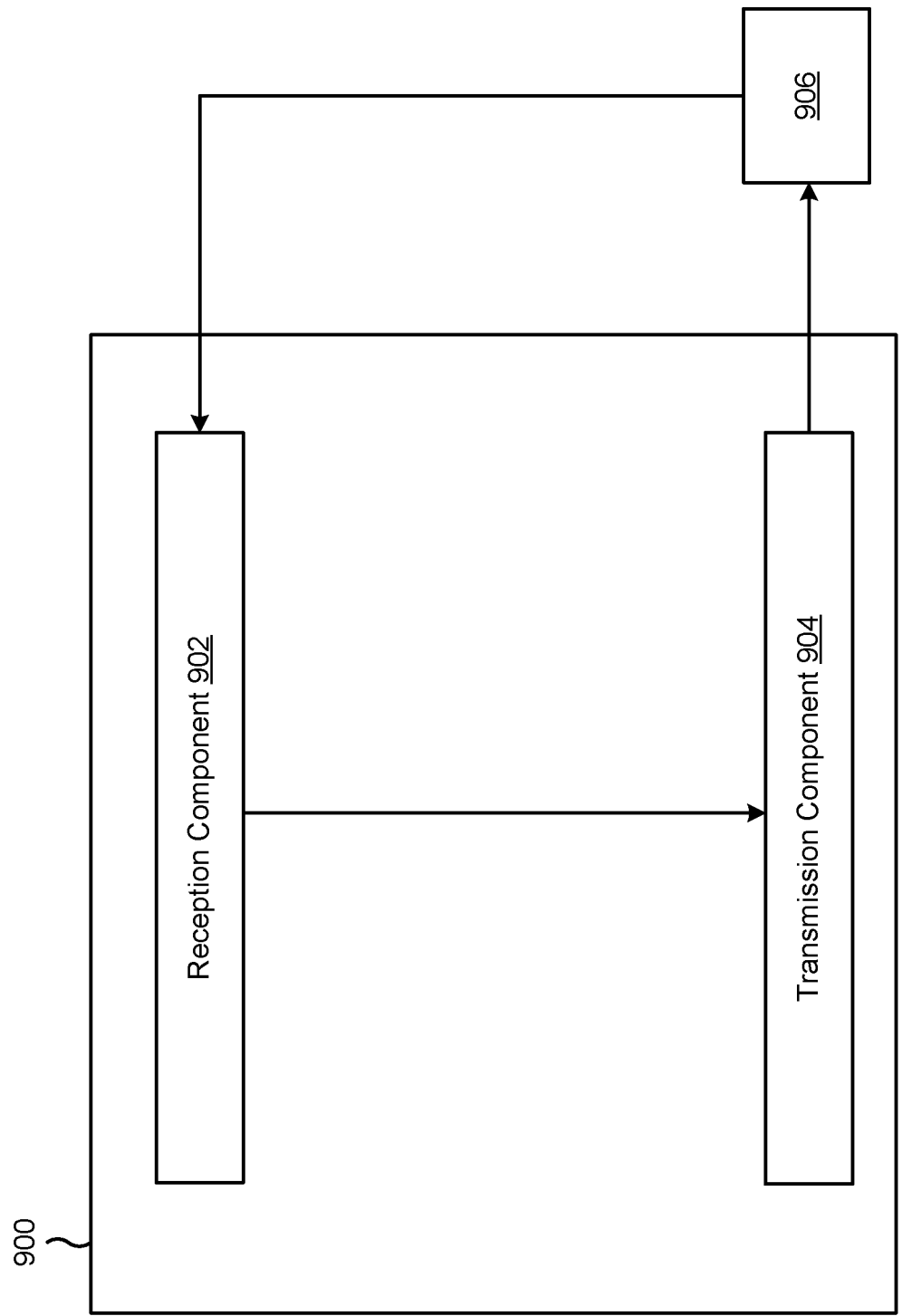
FIGS. 9-10 are block diagrams of example apparatuses for wireless communication, in accordance with the present disclosure.

FIG. 9 is a block diagram of an example apparatus 900 for wireless communication. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904.

In some aspects, the apparatus 900 may be configured to perform one or more operations described herein in connection with FIGS. 4-6. Additionally, or alternatively, the apparatus 900 may be configured to perform one or more processes described herein, such as process 700 of FIG. 7. In some aspects, the apparatus 900 and/or one or more components shown in FIG. 9 may include one or more components of the UE described above in connection with FIG. 2. Additionally, or alternatively, one or more components shown in FIG. 9 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the UE described above in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the UE described above in connection with FIG. 2. In some aspects, the transmission component 904 may be co-located with the reception component 902 in a transceiver.

The reception component 902 may receive, from a base station, an uplink power control configuration for an SRS resource set associated with an uplink component carrier, wherein the uplink power control configuration configures separate power control adjustment states between SRS transmissions and PUSCH transmissions, and wherein the uplink power control configuration indicates one of a first SRS power control adjustment state or a second SRS power control adjustment state. The transmission component 904 may transmit, to the base station, an SRS based at least in part on the uplink power control configuration for the SRS resource set.

The transmission component 904 may transmit, to the base station, UE capability signaling that indicates that the UE supports the separate power control adjustment states between SRS transmissions and PUSCH transmissions, and wherein the UE supports having the first SRS power control adjustment state and the second SRS power control adjustment state separate from PUSCH power control.

The reception component 902 may receive, from the base station, a TPC-accumulation parameter and a two-SRS-power-control-adjustment-states parameter via an SRS configuration that is common to a plurality of SRS resource sets associated with the uplink component carrier, wherein the first SRS power control adjustment state and the second SRS power control adjustment state for SRS transmissions in the uplink component carrier may be maintained based at least in part on the TPC-accumulation parameter and the two-SRS-power-control-adjustment-states parameter.

The reception component 902 may receive, from the base station, DCI that indicates whether TPC commands for the uplink component carrier correspond to the first SRS power control adjustment state or the second SRS power control adjustment state when the uplink component carrier is configured with both the first SRS power control adjustment state and the second SRS power control adjustment state for SRS power control.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
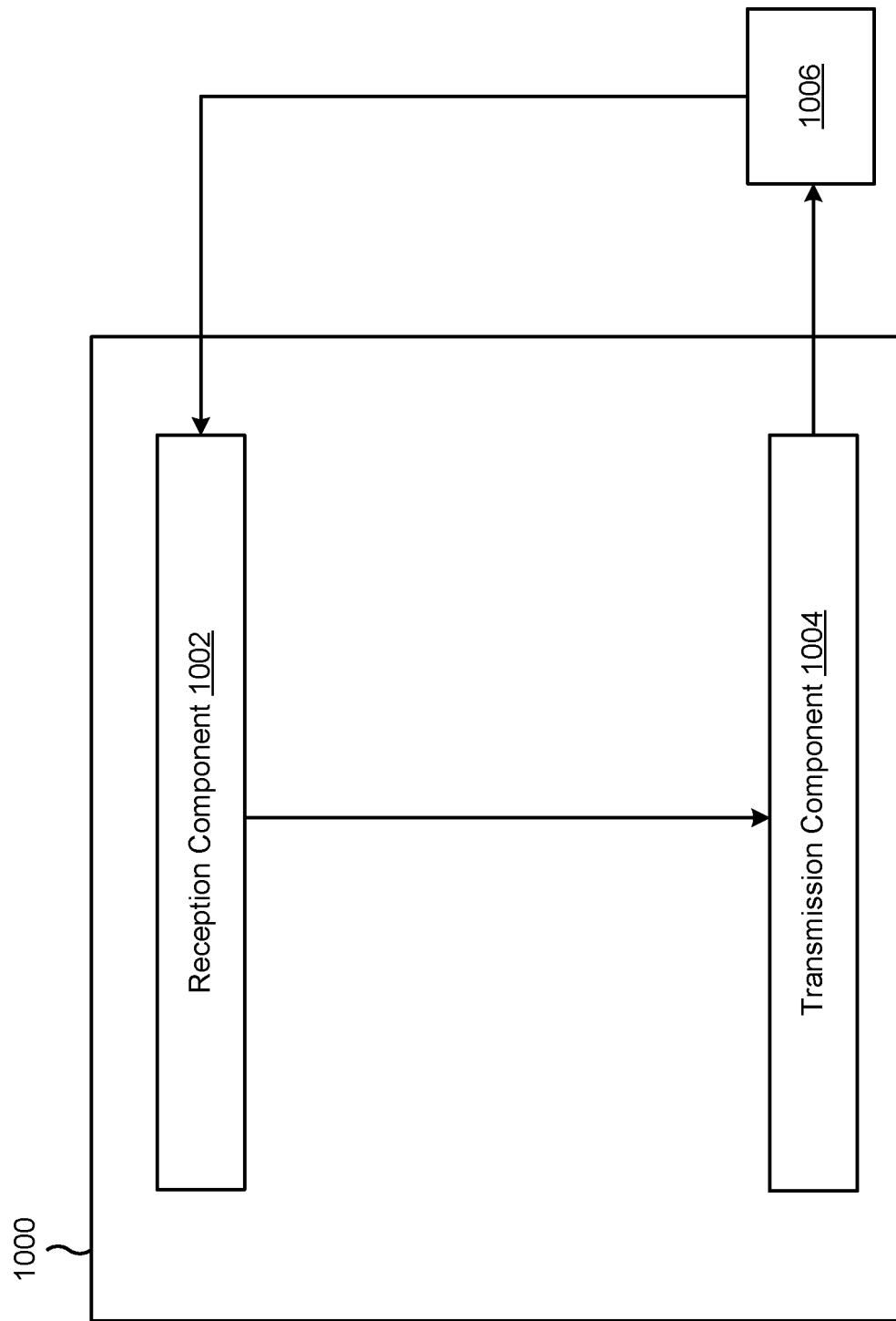

FIG. 10 is a block diagram of an example apparatus 1000 for wireless communication. The apparatus 1000 may be a base station, or a base station may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004.

In some aspects, the apparatus 1000 may be configured to perform one or more operations described herein in connection with FIGS. 4-6. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the base station described above in connection with FIG. 2. Additionally, or alternatively, one or more components shown in FIG. 10 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a demodulator, a MIMO detector, a receive processor, a controller/processor, a memory, or a combination thereof, of the base station described above in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the base station described above in connection with FIG. 2. In some aspects, the transmission component 1004 may be co-located with the reception component 1002 in a transceiver.

The transmission component 1004 may transmit, to a UE, an uplink power control configuration for an SRS resource set associated with an uplink component carrier, wherein the uplink power control configuration configures separate power control adjustment states between SRS transmissions and PUSCH transmissions, and wherein the uplink power control configuration indicates one of a first SRS power control adjustment state or a second SRS power control adjustment state. The reception component 1002 may receive, from the UE, an SRS based at least in part on the uplink power control configuration for the SRS resource set.

The reception component 1002 may receive, from the UE, UE capability signaling that indicates that the UE supports the separate power control adjustment states between SRS transmissions and PUSCH transmissions, and wherein the UE supports having the first SRS power control adjustment state and the second SRS power control adjustment state separate from PUSCH power control.

The transmission component 1004 may transmit, to the UE, the TPC-accumulation parameter and the two-SRS-power-control-adjustment-states parameter via an SRS configuration that is common to a plurality of SRS resource sets associated with the uplink component carrier.

The transmission component 1004 may transmit, to the UE, DCI that indicates whether TPC commands for the uplink component carrier correspond to the first SRS power control adjustment state or the second SRS power control adjustment state when the uplink component carrier is configured with both the first SRS power control adjustment state and the second SRS power control adjustment state for SRS power control.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a user equipment (UE), comprising: receiving, from a base station, an uplink power control configuration for a sounding reference signal (SRS) resource set associated with an uplink component carrier, wherein the uplink power control configuration configures separate power control adjustment states between SRS transmissions and physical uplink shared channel (PUSCH) transmissions, and wherein the uplink power control configuration indicates one of a first SRS power control adjustment state or a second SRS power control adjustment state; and transmitting, to the base station, an SRS based at least in part on the uplink power control configuration for the SRS resource set.

Aspect 2: The method of Aspect 1, further comprising: transmitting, to the base station, UE capability signaling that indicates that the UE supports the separate power control adjustment states between SRS transmissions and PUSCH transmissions, and wherein the UE supports having the first SRS power control adjustment state and the second SRS power control adjustment state separate from PUSCH power control; and wherein receiving the uplink power control configuration for the SRS resource set comprises receiving the uplink power control configuration based at least in part on the UE capability signaling, and wherein receiving the uplink power control configuration for the SRS resource set comprises receiving the uplink power control configuration based at least in part on the UE capability signaling.

Aspect 3: The method of any of Aspects 1 through 2, wherein the first SRS power control adjustment state is associated with a first closed loop index and the second SRS power control adjustment state is associated with a second closed loop index.

Aspect 4: The method of any of Aspects 1 through 3, wherein the SRS resource set is associated with one or more of: a first power control adjustment state that is shared between the SRS and the PUSCH, wherein the first power control adjustment state is associated with a first closed loop index; a second power control adjustment state that is shared between the SRS and the PUSCH, wherein the second power control adjustment state is associated with a second closed loop index; a third power control adjustment state, corresponding to the first SRS power control adjustment state, that is separate for the SRS and the PUSCH, wherein the third power control adjustment state is associated with the first closed loop index; or a fourth power control adjustment state, corresponding to the second SRS power control adjustment state, that is separate for the SRS and the PUSCH, wherein the fourth power control adjustment state is associated with the second closed loop index.

Aspect 5: The method of any of Aspects 1 through 4, wherein the first SRS power control adjustment state and the second SRS power control adjustment state are configured for the uplink component carrier associated with the SRS resource set.

Aspect 6: The method of any of Aspects 1 through 5, further comprising: maintaining the first SRS power control adjustment state and the second SRS power control adjustment state for SRS transmissions in the uplink component carrier based at least in part on a transmit power control accumulation (TPC-accumulation) parameter and a two-SRS-power-control-adjustment-states parameter.

Aspect 7: The method of Aspect 6, further comprising: receiving, from the base station, the TPC-accumulation parameter and the two-SRS-power-control-adjustment-states parameter via an SRS configuration that is common to a plurality of SRS resource sets associated with the uplink component carrier.

Aspect 8: The method of any of Aspects 1 through 7, further comprising: receiving, from the base station, downlink control information (DCI) that indicates whether transmit power control (TPC) commands for the uplink component carrier correspond to the first SRS power control adjustment state or the second SRS power control adjustment state when the uplink component carrier is configured with both the first SRS power control adjustment state and the second SRS power control adjustment state for SRS power control.

Aspect 9: The method of Aspect 8, wherein the DCI is a DCI format 2_3.

Aspect 10: The method of Aspect 8, wherein the DCI includes a block of a first type that is associated with the uplink component carrier.

Aspect 11: The method of Aspect 10, wherein the block includes one bit appended to a TPC field to indicate whether a TPC command associated with the TPC field corresponds to the first SRS power control adjustment state or the second SRS power control adjustment state.

Aspect 12: The method of Aspect 10, wherein the block includes a first TPC field corresponding to the first SRS power control adjustment state and a second TPC field corresponding to the second SRS power control adjustment state.

Aspect 13: The method of Aspect 10, wherein the block includes a TPC field having a TPC command associated with the first SRS power control adjustment state or the second SRS power control adjustment state based at least in part on triggered SRS resource sets indicated by the DCI.

Aspect 14: The method of Aspect 13, wherein: the TPC command is applied to the first SRS power control adjustment state when the triggered SRS resource sets in the uplink component carrier are configured with the first SRS power control adjustment state; or the TPC command is applied to the second SRS power control adjustment state when the triggered SRS resource sets in the uplink component carrier are configured with the second SRS power control adjustment state.

Aspect 15: The method of Aspect 13, wherein the TPC command is applied to one or more of the first SRS power control adjustment state or the second SRS power control adjustment state in accordance with a fixed rule when a first portion of the triggered SRS resource sets in the uplink component carrier are configured with the first SRS power control adjustment state and a second portion of the triggered SRS resource sets in the uplink component carrier are configured with the second SRS power control adjustment state.

Aspect 16: The method of Aspect 14, wherein: the fixed rule indicates that the TPC command is applied to the first SRS power control adjustment state; the fixed rule indicates that the TPC command is applied to one of the first SRS power control adjustment state or the second SRS power control adjustment state that is configured for the SRS resource set with a lowest identifier or a highest identifier among triggered SRS resource sets; or the fixed rule indicates that the TPC command is applied to both the first SRS power control adjustment state and the second SRS power control adjustment state.

Aspect 17: The method of Aspect 8, wherein the DCI indicates the TPC command based at least in part on a radio resource control configuration or based at least in part on a function of an SRS resource set configuration or an SRS request field configuration.

Aspect 18: The method of Aspect 8, wherein the DCI includes a block of a second type that indicates TPC commands for a plurality of uplink component carriers.

Aspect 19: The method of Aspect 18, wherein the block includes one common bit to indicate whether a plurality of TPC commands corresponding to the plurality of uplink component carriers are associated with the first SRS power control adjustment state or the second SRS power control adjustment state.

Aspect 20: The method of Aspect 18, wherein the block includes one bit for each TPC field to indicate whether a TPC command associated with the TPC field corresponds to the first SRS power control adjustment state or the second SRS power control adjustment state.

Aspect 21: The method of Aspect 18, wherein the block includes one bit for a TPC command associated with an uplink component carrier in the plurality of uplink component carriers configured with both the first SRS power control adjustment state and the second SRS power control adjustment state for SRS power control, and wherein the one bit indicates whether the TPC command associated with the TPC field corresponds to the first SRS power control adjustment state or the second SRS power control adjustment state.

Aspect 22: The method of Aspect 18, wherein the block includes a plurality of TPC fields corresponding to the plurality of uplink component carriers and corresponding to the first SRS power control adjustment state, and wherein the block includes a plurality of additional TPC fields corresponding to the plurality of uplink component carriers and corresponding to the second SRS power control adjustment state.

Aspect 23: The method of Aspect 18, wherein the block includes a plurality of TPC fields corresponding to the plurality of uplink component carriers and corresponding to the first SRS power control adjustment state, wherein the block includes an additional TPC field with an additional TPC command for an uplink component carrier in the plurality of uplink component carriers configured with both the first SRS power control adjustment state and the second SRS power control adjustment state for SRS power control, and wherein the additional TPC command is associated with the second SRS power control adjustment state.

Aspect 24: A method of wireless communication performed by a base station, comprising: transmitting, to a user equipment (UE), an uplink power control configuration for a sounding reference signal (SRS) resource set associated with an uplink component carrier, wherein the uplink power control configuration configures separate power control adjustment states between SRS transmissions and physical uplink shared channel (PUSCH) transmissions, and wherein the uplink power control configuration indicates one of a first SRS power control adjustment state or a second SRS power control adjustment state; and receiving, from the UE, an SRS based at least in part on the uplink power control configuration for the SRS resource set.

Aspect 25: The method of Aspect 24, further comprising: receiving, from the UE, UE capability signaling that indicates that the UE supports the separate power control adjustment states between SRS transmissions and PUSCH transmissions, and wherein the UE supports having the first SRS power control adjustment state and the second SRS power control adjustment state separate from PUSCH power control; and wherein transmitting the uplink power control configuration for the SRS resource set comprises transmitting the uplink power control configuration based at least in part on the UE capability signaling. wherein transmitting the uplink power control configuration for the SRS resource set comprises transmitting the uplink power control configuration based at least in part on the UE capability signaling.

Aspect 26: The method of any of Aspects 24 through 25, wherein the first SRS power control adjustment state and the second SRS power control adjustment state for SRS transmissions in the uplink component carrier are based at least in part on a transmit power control (TPC)-accumulation parameter and a two-SRS-power-control-adjustment-states parameter.

Aspect 27: The method of Aspect 26, further comprising: transmitting, to the UE, the TPC-accumulation parameter and the two-SRS-power-control-adjustment-states parameter via an SRS configuration that is common to a plurality of SRS resource sets associated with the uplink component carrier.

Aspect 28: The method of any of Aspects 24 through 27, further comprising: transmitting, to the UE, downlink control information (DCI) that indicates whether transmit power control (TPC) commands for the uplink component carrier correspond to the first SRS power control adjustment state or the second SRS power control adjustment state when the uplink component carrier is configured with both the first SRS power control adjustment state and the second SRS power control adjustment state for SRS power control.

Aspect 29: The method of Aspect 28, wherein the DCI is a DCI format 2_3.

Aspect 30: The method of Aspect 28, wherein the DCI includes a block of a first type that is associated with the uplink component carrier.

Aspect 31: The method of Aspect 28, wherein the DCI includes a block of a second type that indicates TPC commands for a plurality of uplink component carriers.

Aspect 32: An apparatus for wireless communication at a device, comprising a processor; memory coupled with the processor; and instructions stored in the memory and executable by the processor to cause the apparatus to perform the method of one or more of Aspects 1-23.

Aspect 33: A device for wireless communication, comprising a memory and one or more processors coupled to the memory, the memory and the one or more processors configured to perform the method of one or more of Aspects 1-23.

Aspect 34: An apparatus for wireless communication, comprising at least one means for performing the method of one or more of Aspects 1-23.

Aspect 35: A non-transitory computer-readable medium storing code for wireless communication, the code comprising instructions executable by a processor to perform the method of one or more of Aspects 1-23.

Aspect 36: A non-transitory computer-readable medium storing a set of instructions for wireless communication, the set of instructions comprising one or more instructions that, when executed by one or more processors of a device, cause the device to perform the method of one or more of Aspects 1-23.

Aspect 37: An apparatus for wireless communication at a device, comprising a processor; memory coupled with the processor; and instructions stored in the memory and executable by the processor to cause the apparatus to perform the method of one or more of Aspects 24-31.

Aspect 38: A device for wireless communication, comprising a memory and one or more processors coupled to the memory, the memory and the one or more processors configured to perform the method of one or more of Aspects 24-31.

Aspect 39: An apparatus for wireless communication, comprising at least one means for performing the method of one or more of Aspects 24-31.

Aspect 40: A non-transitory computer-readable medium storing code for wireless communication, the code comprising instructions executable by a processor to perform the method of one or more of Aspects 24-31.

Aspect 41: A non-transitory computer-readable medium storing a set of instructions for wireless communication, the set of instructions comprising one or more instructions that, when executed by one or more processors of a device, cause the device to perform the method of one or more of Aspects 24-31.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   one or more memories; and
   one or more processors, coupled to the one or more memories, configured to:
      receive, from a base station, an uplink power control configuration for a sounding reference signal (SRS) resource set associated with an uplink component carrier, wherein the uplink power control configuration configures separate power control adjustment states between SRS transmissions and physical uplink shared channel (PUSCH) transmissions, and wherein the uplink power control configuration indicates a power control adjustment state from one of:
         a first SRS power control adjustment state that is separate for the SRS transmissions and the PUSCH and that is associated with a first closed loop index, and
         a second SRS power control adjustment state that is separate for the SRS transmissions and the PUSCH and that is associated with a second closed loop index; and
      transmit, to the base station, an SRS based at least in part on the uplink power control configuration for the SRS resource set.

2. The UE of claim 1, wherein:
   the one or more processors are further configured to transmit, to the base station, UE capability signaling that indicates that the UE supports the separate power control adjustment states between SRS transmissions and PUSCH transmissions, and wherein the UE supports having the first SRS power control adjustment state and the second SRS power control adjustment state separate from PUSCH power control; and
   the one or more processors, to receive the uplink power control configuration for the SRS resource set, are configured to receive the uplink power control configuration based at least in part on the UE capability signaling.

3. The UE of claim 1, wherein the SRS resource set is associated with one or more of:
   a first power control adjustment state that is shared between the SRS and the PUSCH, wherein the first power control adjustment state is associated with the first closed loop index;
   a second power control adjustment state that is shared between the SRS and the PUSCH, wherein the second power control adjustment state is associated with the second closed loop index;
   a third power control adjustment state corresponding to the first SRS power control adjustment state; or
   a fourth power control adjustment state corresponding to the second SRS power control adjustment state.

4. The UE of claim 1, wherein the first SRS power control adjustment state and the second SRS power control adjustment state are configured for the uplink component carrier associated with the SRS resource set.

5. The UE of claim 1, wherein the one or more processors are further configured to:
   maintain the first SRS power control adjustment state and the second SRS power control adjustment state for SRS transmissions in the uplink component carrier based at least in part on a transmit power control accumulation (TPC-accumulation) parameter and a two-SRS-power-control-adjustment-states parameter.

6. The UE of claim 5, wherein the one or more processors are further configured to:
   receive, from the base station, the TPC-accumulation parameter and the two-SRS-power-control-adjustment-states parameter via an SRS configuration that is common to a plurality of SRS resource sets associated with the uplink component carrier.

7. The UE of claim 1, wherein the one or more processors are further configured to:
   receive, from the base station, downlink control information (DCI) that indicates whether transmit power control (TPC) commands for the uplink component carrier correspond to the first SRS power control adjustment state or the second SRS power control adjustment state when the uplink component carrier is configured with both the first SRS power control adjustment state and the second SRS power control adjustment state for SRS power control.

8. The UE of claim 7, wherein the DCI is a DCI format 2_3.

9. The UE of claim 7, wherein the DCI includes a block of a first type that is associated with the uplink component carrier.

10. The UE of claim 9, wherein the block includes one bit appended to a TPC field to indicate whether a TPC command associated with the TPC field corresponds to the first SRS power control adjustment state or the second SRS power control adjustment state.

11. The UE of claim 9, wherein the block includes a first TPC field corresponding to the first SRS power control adjustment state and a second TPC field corresponding to the second SRS power control adjustment state.

12. The UE of claim 9, wherein the block includes a TPC field having a TPC command associated with the first SRS power control adjustment state or the second SRS power control adjustment state based at least in part on triggered SRS resource sets indicated by the DCI.

13. The UE of claim 12, wherein:
the TPC command is applied to the first SRS power control adjustment state when the triggered SRS resource sets in the uplink component carrier are configured with the first SRS power control adjustment state; or
the TPC command is applied to the second SRS power control adjustment state when the triggered SRS resource sets in the uplink component carrier are configured with the second SRS power control adjustment state.

14. The UE of claim 12, wherein the TPC command is applied to one or more of the first SRS power control adjustment state or the second SRS power control adjustment state in accordance with a fixed rule when a first portion of the triggered SRS resource sets in the uplink component carrier are configured with the first SRS power control adjustment state and a second portion of the triggered SRS resource sets in the uplink component carrier are configured with the second SRS power control adjustment state.

15. The UE of claim 14, wherein:
the fixed rule indicates that the TPC command is applied to the first SRS power control adjustment state;
the fixed rule indicates that the TPC command is applied to one of the first SRS power control adjustment state or the second SRS power control adjustment state that is configured for the SRS resource set with a lowest identifier or a highest identifier among triggered SRS resource sets; or
the fixed rule indicates that the TPC command is applied to both the first SRS power control adjustment state and the second SRS power control adjustment state.

16. The UE of claim 7, wherein the DCI indicates a TPC command based at least in part on a radio resource control configuration or based at least in part on a function of an SRS resource set configuration or an SRS request field configuration.

17. The UE of claim 7, wherein the DCI includes a block of a second type that indicates TPC commands for a plurality of uplink component carriers.

18. The UE of claim 17, wherein the block includes one common bit to indicate whether a plurality of TPC commands corresponding to the plurality of uplink component carriers are associated with the first SRS power control adjustment state or the second SRS power control adjustment state.

19. The UE of claim 17, wherein the block includes one bit for each TPC field to indicate whether a TPC command associated with the TPC field corresponds to the first SRS power control adjustment state or the second SRS power control adjustment state.

20. The UE of claim 17, wherein the block includes one bit for a TPC command associated with an uplink component carrier in the plurality of uplink component carriers configured with both the first SRS power control adjustment state and the second SRS power control adjustment state for SRS power control, and wherein the one bit indicates whether the TPC command associated with a TPC field corresponds to the first SRS power control adjustment state or the second SRS power control adjustment state.

21. The UE of claim 17, wherein the block includes a plurality of TPC fields corresponding to the plurality of uplink component carriers and corresponding to the first SRS power control adjustment state, and wherein the block includes a plurality of additional TPC fields corresponding to the plurality of uplink component carriers and corresponding to the second SRS power control adjustment state.

22. The UE of claim 17, wherein the block includes a plurality of TPC fields corresponding to the plurality of uplink component carriers and corresponding to the first SRS power control adjustment state, wherein the block includes an additional TPC field with an additional TPC command for an uplink component carrier in the plurality of uplink component carriers configured with both the first SRS power control adjustment state and the second SRS power control adjustment state for SRS power control, and wherein the additional TPC command is associated with the second SRS power control adjustment state.

23. A base station for wireless communication, comprising:
one or more memories; and
one or more processors, coupled to the one or more memories, configured to:
transmit, to a user equipment (UE), an uplink power control configuration for a sounding reference signal (SRS) resource set associated with an uplink component carrier, wherein the uplink power control configuration configures separate power control adjustment states between SRS transmissions and physical uplink shared channel (PUSCH) transmissions, and wherein the uplink power control configuration indicates a power control adjustment state from one of:
a first SRS power control adjustment state that is separate for the SRS transmissions and the PUSCH and that is associated with a first closed loop index, and
a second SRS power control adjustment state that is separate for the SRS transmissions and the PUSCH and that is associated with a second closed loop index; and
receive, from the UE, an SRS based at least in part on the uplink power control configuration for the SRS resource set.

24. The base station of claim 23, wherein:
the one or more processors are further configured to receive, from the UE, UE capability signaling that indicates that the UE supports the separate power control adjustment states between SRS transmissions and PUSCH transmissions, and wherein the UE supports having the first SRS power control adjustment state and the second SRS power control adjustment state separate from PUSCH power control; and
the one or more processors, to transmit the uplink power control configuration for the SRS resource set, are configured to transmit the uplink power control configuration based at least in part on the UE capability signaling.

25. The base station of claim 23, wherein:
the first SRS power control adjustment state and the second SRS power control adjustment state for SRS transmissions in the uplink component carrier are based at least in part on a transmit power control accumulation (TPC-accumulation) parameter and a two-SRSpower-control-adjustment-states parameter, and the one or more processors are further configured to:
transmit, to the UE, the TPC-accumulation parameter and the two-SRS-power-control-adjustment-states parameter via an SRS configuration that is common to a plurality of SRS resource sets associated with the uplink component carrier.

26. The base station of claim 23, wherein the one or more processors are further configured to:
transmit, to the UE, downlink control information (DCI) that indicates whether transmit power control (TPC) commands for the uplink component carrier correspond to the first SRS power control adjustment state or the second SRS power control adjustment state when the uplink component carrier is configured with both the first SRS power control adjustment state and the second SRS power control adjustment state for SRS power control.

27. The base station of claim 26, wherein:
the DCI includes a block of a first type that is associated with the uplink component carrier; or
the DCI includes a block of a second type that indicates TPC commands for a plurality of uplink component carriers.

28. A method of wireless communication performed by a user equipment (UE), comprising:
receiving, from a base station, an uplink power control configuration for a sounding reference signal (SRS) resource set associated with an uplink component carrier, wherein the uplink power control configuration configures separate power control adjustment states between SRS transmissions and physical uplink shared channel (PUSCH) transmissions, and wherein the uplink power control configuration indicates a power control adjustment state from one of:
a first SRS power control adjustment state that is separate for the SRS transmissions and the PUSCH and that is associated with a first closed loop index, and
a second SRS power control adjustment state that is separate for the SRS transmissions and the PUSCH and that is associated with a second closed loop index; and
transmitting, to the base station, an SRS based at least in part on the uplink power control configuration for the SRS resource set.

29. A method of wireless communication performed by a base station, comprising:
transmitting, to a user equipment (UE), an uplink power control configuration for a sounding reference signal (SRS) resource set associated with an uplink component carrier, wherein the uplink power control configuration configures separate power control adjustment states between SRS transmissions and physical uplink shared channel (PUSCH) transmissions, and wherein the uplink power control configuration indicates a power control adjustment state from one of:
a first SRS power control adjustment state that is separate for the SRS transmissions and the PUSCH and that is associated with a first closed loop index, and
a second SRS power control adjustment state that is separate for the SRS transmissions and the PUSCH and that is associated with a second closed loop index; and
receiving, from the UE, an SRS based at least in part on the uplink power control configuration for the SRS resource set.

30. The base station of claim 23, wherein the SRS resource set is associated with one or more of:
a first power control adjustment state that is shared between the SRS and the PUSCH, wherein the first power control adjustment state is associated with the first closed loop index;
a second power control adjustment state that is shared between the SRS and the PUSCH, wherein the second power control adjustment state is associated with the second closed loop index;
a third power control adjustment state corresponding to the first SRS power control adjustment state; or
a fourth power control adjustment state corresponding to the second SRS power control adjustment state.

* * * * *